US008210948B2

(12) United States Patent  
Shimada et al.

(10) Patent No.: US 8,210,948 B2
(45) Date of Patent: Jul. 3, 2012

(54) RECORDING MEDIUM REPRODUCING APPARATUS, RECORDING MEDIUM REPRODUCING METHOD, AND PORTABLE RECORDING MEDIUM

(75) Inventors: Masaaki Shimada, Tokyo (JP); Tomoaki Ryu, Tokyo (JP); Kazuhiko Nakane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1519 days.

(21) Appl. No.: 11/661,942

(22) PCT Filed: Jul. 15, 2005

(86) PCT No.: PCT/JP2005/013119
§ 371 (c)(1),
(2), (4) Date: Mar. 6, 2007

(87) PCT Pub. No.: WO2007/010587
PCT Pub. Date: Jan. 25, 2007

(65) Prior Publication Data
US 2007/0265098 A1    Nov. 15, 2007

(51) Int. Cl.
*A63F 13/00* (2006.01)
(52) U.S. Cl. ............... 463/43; 463/31; 463/33
(58) Field of Classification Search .............. 463/30, 463/31, 33, 35, 43
See application file for complete search history.

(56) References Cited

U.S. PATENT DOCUMENTS

| 7,811,173 | B2 * | 10/2010 | Lau et al. ................ 463/43 |
| 2002/0128067 | A1 | 9/2002 | Blanco |
| 2005/0014563 | A1 * | 1/2005 | Barri .................... 463/43 |
| 2005/0075166 | A1 * | 4/2005 | Hemstreet et al. ........ 463/30 |
| 2005/0220439 | A1 * | 10/2005 | Carton et al. ........... 386/4 |

FOREIGN PATENT DOCUMENTS

| JP | 01-100783 | 4/1989 |
| JP | 8-234709 A | 9/1996 |
| JP | 2000-242601 A | 9/2000 |
| JP | 2001-128025 A | 5/2001 |
| JP | 2001-326829 A | 11/2001 |
| JP | 2001-326909 A | 11/2001 |
| JP | 2002-140155 A | 5/2002 |
| JP | 2002-306842 A | 10/2002 |

* cited by examiner

*Primary Examiner* — James S McClellan
(74) *Attorney, Agent, or Firm* — Birch, Stewart, Kolasch & Birch, LLP.

(57) ABSTRACT

A portable recording medium (100) stores video contents and icon information relating to an icon picture associated with the video contents and indicative of an operation mode corresponding to user operation of the recording medium reproducing apparatus (1). The recording medium reproducing apparatus (1) includes an image display plane (8) which is a frame memory area used for displaying video data of the video contents stored in the portable recording medium (100); a memory (15, 16) which stores the icon information stored in the portable recording medium (100); an OSD plane (18) which is a frame memory area used for displaying the icon picture on the basis of the icon information stored in the memory (15, 16); and a synthesizing device (10) which synthesizes the data held in the video display plane (8) and the data held in the information display plane (18), thereby outputting a superimposed video signal.

14 Claims, 25 Drawing Sheets

FIG. 5

| LANGUAGE | RESOLUTION | NUMBER OF COLORS | SIZE | ID NUMBER |
|---|---|---|---|---|
| JP | HD | 64K | LARGE | #001 |
| JP | HD | 64K | MIDDLE | #002 |
| JP | HD | 64K | SMALL | #003 |
| JP | HD | 256 | LARGE | #004 |
| JP | HD | 256 | MIDDLE | #005 |
| JP | HD | 256 | SMALL | #006 |
| JP | HD | 64 | LARGE | #007 |
| JP | HD | 64 | MIDDLE | #008 |
| JP | HD | 64 | SMALL | #009 |
| JP | SD | 64K | LARGE | #010 |
| JP | SD | 64K | MIDDLE | #011 |
| JP | SD | 64K | SMALL | #012 |
| JP | SD | 256 | LARGE | #013 |
| JP | SD | 256 | MIDDLE | #014 |
| JP | SD | 256 | SMALL | #015 |
| JP | SD | 64 | LARGE | #016 |
| JP | SD | 64 | MIDDLE | #017 |
| JP | SD | 64 | SMALL | #018 |
| EN | HD | 64K | LARGE | #019 |
| EN | HD | 64K | MIDDLE | #020 |
| EN | HD | 64K | SMALL | #021 |

33       52

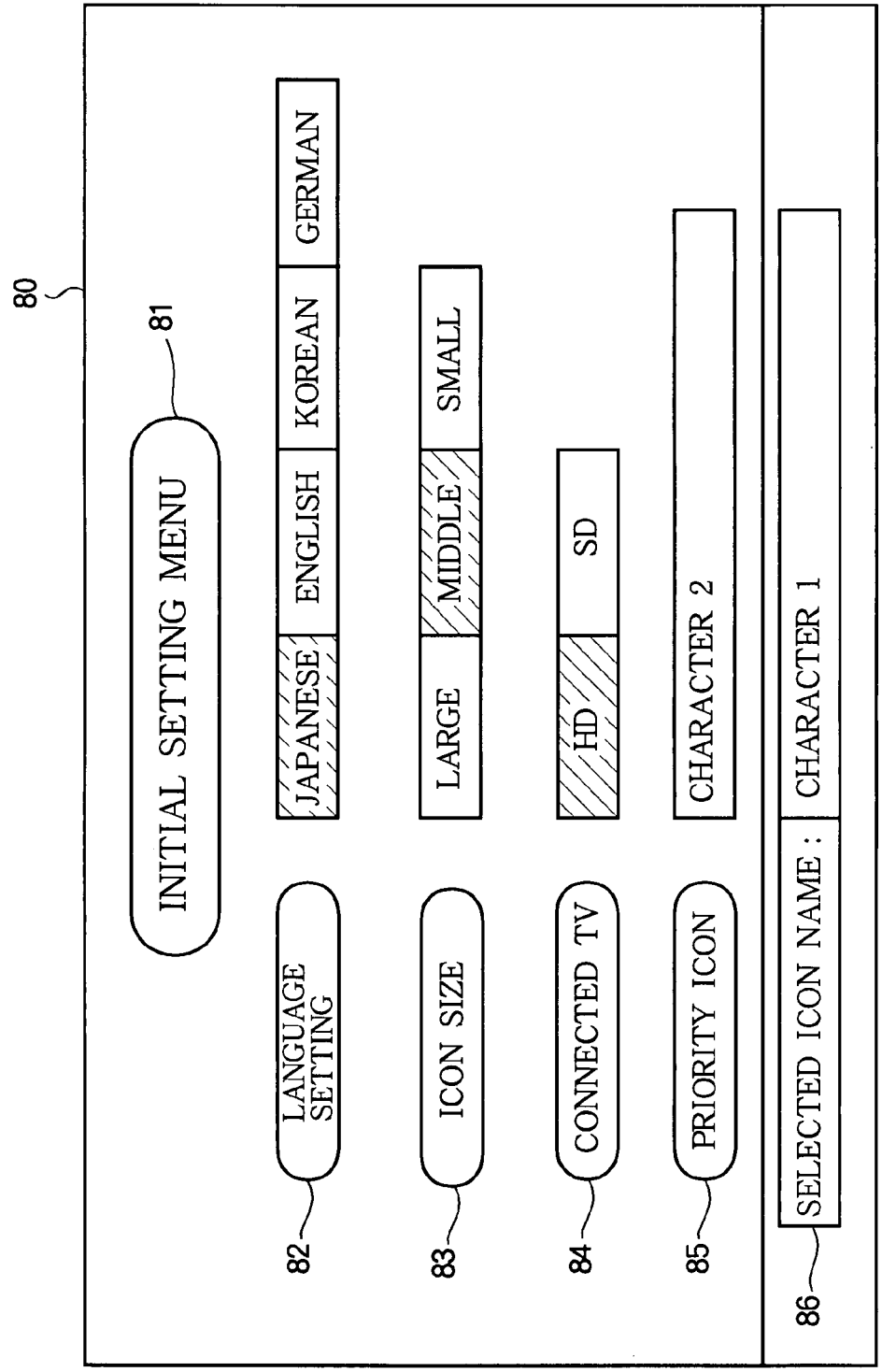

FIG.9

| OPERATION MODE | NUMBER OF CONSTITUENTS | FRAME RATE | DISPLAY TIME |
|---|---|---|---|
| PLAY | 1 (STILL IMAGE) | — | 2 sec |
| STOP | 1 (STILL IMAGE) | — | 2 sec |
| PROHIBITED | 3 | 3 f/sec | 2 sec |
| FF | 5 | 5 f/sec | Endless |
| REW | 5 | 5 f/sec | Endless |
| PAUSE | 1 (STILL IMAGE) | — | Endless |
| FOWARD SLOW | 4 | 0.5 f/sec | 2 sec |
| REVERSE SLOW | 4 | 0.5 f/sec | 2 sec |
| FRAME ADVANCE | 1 (STILL IMAGE) | — | 2 sec |
| FRAME RETURN | 1 (STILL IMAGE) | — | 2 sec |

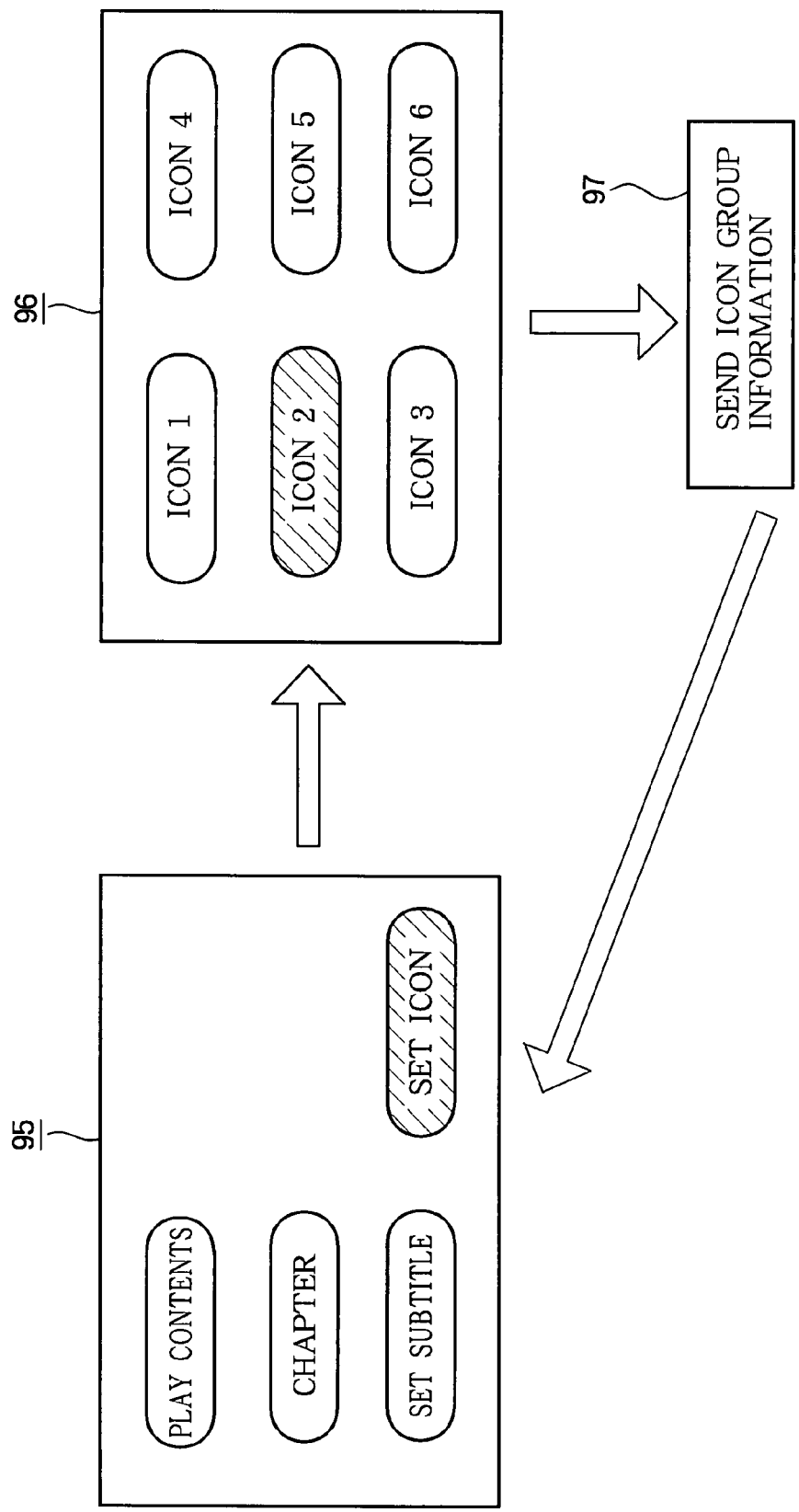

RECORDING MEDIUM REPRODUCING APPARATUS, RECORDING MEDIUM REPRODUCING METHOD, AND PORTABLE RECORDING MEDIUM

TECHNICAL FIELD

The present invention relates to a portable recording medium such as various kinds of DVDs including a DVD-R (Digital Versatile Disk Recordable) and a DVD-RW (Digital Versatile Disk Rewritable) and a semiconductor memory, and also to a recording medium reproducing apparatus and a recording medium reproducing method for reproducing a program recorded in the portable recording medium.

BACKGROUND ART

As conventionally known, there is a game system which includes a memory, a processor connected to the memory, and a console application arranged to be stored in the memory, to be executable by the processor and to create a sound track including a plurality of audio tracks. This game system has a function of extracting audio tracks from an audio source such as an audio CD or a DVD and storing them in a hard disk drive or the like (refer to Patent Document 1, for example).

Further, in general, a conventional recording medium reproducing apparatus previously holds image information of icons, each of which is formed by a symbol(s) or the like indicative of each operation mode (each operation such as PLAY, FAST FORWARD, and STOP) corresponding to the user operations in the recording medium reproducing apparatus. When each operation mode is executed, an icon corresponding to each operation mode is displayed on a display device.

Patent Document 1: Japanese Patent Application Kokai (Laid-Open) Publication No. 2002-306842 (Claims 1, 4 and 5, and Paragraphs 0007-0009 and 0057)

DISCLOSURE OF THE INVENTION

Problems to be Solved by the Invention

The above-mentioned Patent Document 1 discloses a technique for extracting the audio tracks from the audio source. However, it fails to disclose a technique relating to icon information.

Further, the icon displaying function adopted by the conventional recording medium reproducing apparatus is to display an icon based on the icon information previously held in the apparatus, on the display screen of the display device at a predetermined location as a still image. Therefore, the conventional icon displaying function is not interesting to the user.

The present invention aims at solving the above-mentioned problems in the conventional art. An object of the present invention is to provide a recording medium reproducing apparatus and a recording medium reproducing method which make it possible to download icon information from a portable recording medium and also make it possible to selectively extract suitable icon information of the downloaded icon information when contents stored in the portable recording medium are reproduced and to display an icon based on the extracted icon information. Another object of the present invention is to provide a portable recording medium that can cause the recording medium reproducing apparatus to execute automatic downloading of the icon information when the portable recording medium is loaded in the recording medium reproducing apparatus.

Means of Solving the Problems

According to one aspect of the present invention, a recording medium reproducing apparatus reproduces a portable recording medium storing video contents and icon information relating to an icon picture associated with the video contents and indicative of an operation mode corresponding to user operation of the recording medium reproducing apparatus. The apparatus includes an image plane which is a frame memory area used for displaying video data of the video contents; a storage means which stores the icon information stored in the portable recording medium; an information display plane which is a frame memory area used for displaying the icon picture on the basis of the icon information stored in the storage means; a selection means which selects the icon information to be held in the information display plane from the icon information stored in the storage means on the basis of a display capability of the information display plane; and a synthesizing means which synthesizes the video data held in the image plane and the icon picture data held in the information display plane, thereby outputting a superimposed video signal.

Further, according to another aspect of the present invention, a recording medium reproducing apparatus reproduces a portable recording medium storing video contents and icon information relating to an icon picture associated with the video contents and indicative of an operation mode corresponding to user operation of the recording medium reproducing apparatus. The apparatus includes an image plane which is a frame memory area used for displaying video data of the video contents; a storage means which stores the icon information stored in the portable recording medium; an information display plane which is a frame memory area used for displaying the icon picture on the basis of the icon information stored in the storage means; a selection means which selects the icon information to be held in the information display plane from the icon information stored in the storage means on the basis of a display capability of an image display apparatus electrically connected to the recording medium reproducing apparatus; and a synthesizing means which synthesizes the video data held in the image plane and the icon picture data held in the information display plane, thereby outputting a superimposed video signal.

Furthermore, according to a further aspect of the present invention, a recording medium reproducing method can be used for reproducing a portable recording medium storing video contents and icon information relating to an icon picture associated with the video contents and indicative of an operation mode corresponding to user operation of the recording medium reproducing apparatus. The method includes the steps: storing the icon information stored in the portable recording medium, in a storage means; selecting the icon information to be held in the information display plane from the icon information stored in the storage means on the basis of a display capability of an information display plane, which is a frame memory area used for displaying the icon picture, on the basis of the icon information stored in the storage means; and synthesizing the video data held in an image plane, which is a frame memory area used for displaying video data of the video contents, and the icon picture data held in the information display plane, thereby outputting a superimposed video signal.

Moreover, according to a yet further aspect of the present invention, a recording medium reproducing method can be used for reproducing a portable recording medium storing video contents and icon information relating to an icon picture associated with the video contents and indicative of an operation mode corresponding to user operation of the recording medium reproducing apparatus. The method includes the steps: storing the icon information stored in the portable recording medium, in a storage means; selecting the icon information to be held in an information display plane from the icon information stored in the storage means on the basis of a display capability of an image display apparatus electrically connected to the recording medium reproducing apparatus, the information display plane being a frame memory area used for displaying the icon picture on the basis of the icon information stored in the storage means; and synthesizing the video data held in an image plane, which is a frame memory area used for displaying video data of the video contents, and the icon picture data held in the information display plane, thereby outputting a superimposed video signal.

In addition, according to a yet further aspect of the present invention, a portable recording medium for storing information, wherein the information stored in the portable recording medium is reproduced by a recording medium reproducing apparatus, includes: an icon information storage area for storing icon information relating to an icon picture indicative of an operation mode corresponding to user operation of the recording medium reproducing apparatus; and an icon data transfer command storage area for storing a command for use in the recording medium reproducing apparatus in order to transmit the icon information stored in the icon information storage area to the recording medium reproducing apparatus, the command causing the recording medium reproducing apparatus to acquire the icon information stored in the portable recording medium after the recording medium reproducing apparatus has acquired the command.

Effects of the Invention

In the recording medium reproducing apparatus and the recording medium reproducing method of the present invention, the icon information to be held in the information display plane is selected from the icon information stored in the storage means on the basis of the display capability of the information display plane or on the basis of the display capability of the image display device electrically connected to the recording medium reproducing apparatus. Therefore, the size of an icon to be displayed can be suitable.

Further, in the recording medium reproducing apparatus and the recording medium reproducing method of the present invention, the downloaded icon information is held in the information display plane provided for status display, and video contents to be reproduced from the portable recording medium is held in an image plane. Therefore, an icon based on the downloaded icon information can be displayed on the display device without impairing the expression of the image displayed on the basis of the video contents and without complicating the structure of the recording medium reproducing apparatus.

Furthermore, the portable recording medium of the present invention has an advantage that the icon information is automatically downloaded to the recording medium reproducing apparatus by executing an icon data transfer command.

BRIEF DESCRIPTION OF THE DRAWINGS

FIG. 5 is a diagram for explaining a relation between the group management information and the icon unit header information on the icon unit in the first embodiment;

FIG. 8 is a diagram showing an example of an initial setting menu of the recording medium reproducing apparatus displayed on the display screen of the display device;

FIG. 9 is a diagram showing kinds and specifications of the icons as an example;

FIG. 11 is a diagram showing a menu display screen for icon selection;

Figure 1:
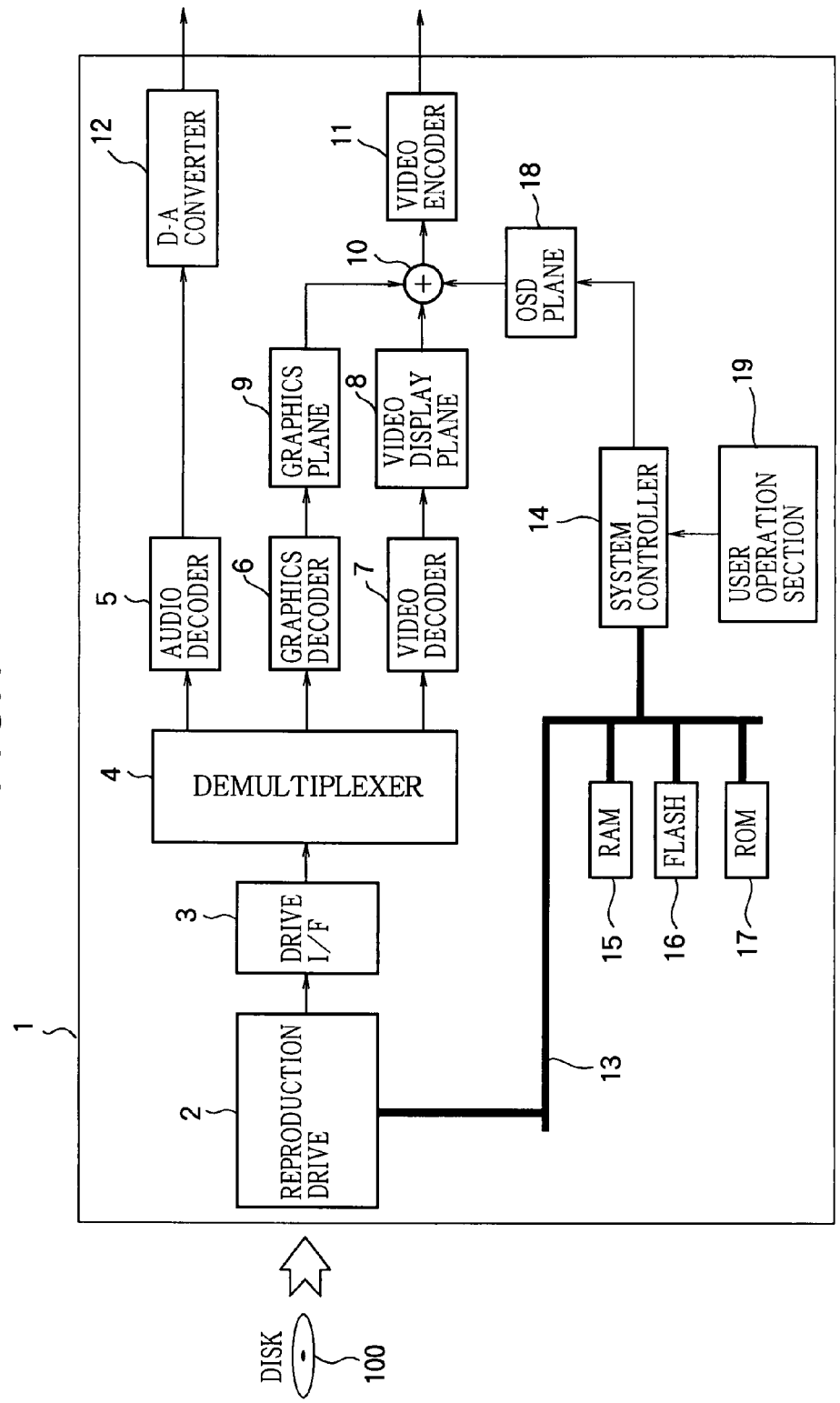
FIG. 1 is a block diagram showing an arrangement of a recording medium reproducing apparatus according to the first embodiment of the present invention.

DESCRIPTION OF REFERENCE NUMERALS 1 and 200 recording medium reproducing apparatus; 100, 201 and 220 DVD-ROM disk; 2 reproduction drive; 3 drive I/F; 4 demultiplexer; 5 audio decoder; 6 graphics decoder; 7 video decoder; 8 video display plane; 9 graphics plane; 10 and 202 synthesizing device; 11 video encoder; 12 D-A converter; 13 data address bus; 15 RAM area; 16 FLASH area; 17 ROM area; 18 OSD plane; 19 user operation section; 26 and 222 icon information area; 32 and 223 icon group; 33 and 236 group management information; 34 and 224 icon unit; 203 sound group; 221 data heap.

BEST MODE FOR CARRYING OUT THE INVENTION

First of all, presuppositions for the embodiment to be described below will be explained specifically below. In the following description, it is assumed that a portable recording medium is a DVD-ROM (Digital Versatile Disk Read Only Memory) disk and MPEG-2 compressed program picture data is recorded in the DVD-ROM disk. However, the portable recording medium to which the present invention is applicable is not limited to the aforementioned disk, but may include various types of recording media such as a DVD-RAM (Digital Versatile Disk Random Access Memory), a DVD-R and a semiconductor memory (e.g., a smart media (registered trademark). Further, a program recorded in the portable recording medium may include contents such as music, movie, education and so on recorded in the portable recording medium.

In the present patent application, an expression "icon picture" refers to a figure and/or a textual comment indicative of an operation mode corresponding to a user operation of the recording medium reproducing apparatus. The icon picture includes, for example, a picture which expresses a symbol indicative of an operation mode of the recording medium reproducing apparatus such as PLAY, RECORD, FAST FORWARD (FF), REWIND (REW), STOP, and PAUSE as information about a figure and/or a letter on the display screen of a display device when the user specifies and executes FAST FORWARD or REWIND operation in a reproduction mode of a program recorded in the portable recording medium or when the user changes the operation mode, and a picture which expresses a figure and/or a letter indicative of an invalid user operation when a prohibited user operation is set for the recording medium reproducing apparatus.

First Embodiment

FIG. 1 is a block diagram showing an arrangement of a recording medium reproducing apparatus 1 according to the first embodiment. The recording medium reproducing apparatus 1 of the first embodiment is a device capable of executing a recording medium reproducing method of the present invention. As shown in FIG. 1, the recording medium reproducing apparatus 1 includes a reproduction drive 2 into which a DVD-ROM disk 100 as a portable recording medium is inserted, a drive I/F 3, a demultiplexer 4, an audio decoder 5, a graphics decoder 6, a video decoder 7, a video display plane (image plane) 8 as a frame memory area used for displaying an analog picture, a graphics plane 9 as a frame memory for storing sub-video data, a synthesizing device 10, a video encoder 11, a D-A converter 12, a data address bus 13, a system controller 14, a RAM area 15, a FLASH area 16, a ROM area 17, an OSD plane 18 as another frame memory area for an OSD (On Screen Display), and a user operation section 19. The drive I/F 3, the system controller 14, the RAM area 15, the FLASH area 16, and the ROM area 17 are interconnected by the data address bus 13.

Referring to FIG. 1, the recording medium reproducing apparatus 1 reproduces a program picture recorded in the DVD-ROM disk 100. When the DVD-ROM disk 100 is inserted into the reproduction drive 2, a digital modulated signal is read out from the disk 100. Thereafter, the read-out signal is supplied to the drive I/F 3, digitally demodulated, and then supplied to the demultiplexer 4. The signal digitally demodulated by the drive I/F 3 is made up of a plurality of kinds of pack data, that is, a video pack, a sound pack and a sub-video pack, which have the same information length but are interleaved with one another. The following description will be made in connection with a case where the signal is classified into three types of pack information. However, the signal in question may include, in addition to the above three types of pack information, data type information having different purposes such as still image data and control data. Further, sound pack information in the above three types of pack information may also be absent in some cases.

The demultiplexer 4 plays a role of separating the input signal into video data, sound data, and sub-video data by collecting and recombining pack data for each of the types of pack data. The video data output from the demultiplexer 4 is supplied to the video decoder 7. The video decoder 7 expands the video data (encoded video-compressed signal read out from the disk 100) to generate an analog video signal. The analog video signal generated by the video decoder 7 is stored in the video display plane (image plane) 8 for use of displaying an analog picture. Similarly, the sub-video data is converted into a YUV signal in the graphics decoder 6 and stored in the graphics plane 9 as a plane memory.

On the other hand, the sound data generated by the demultiplexer 4 is converted by the audio decoder 5 to a digital sound signal. Thereafter, the digital sound signal is converted by the D-A converter 12 into an analog sound signal and then output it to the outside. In the first embodiment, when the user operates the recording medium reproducing apparatus 1 through the user operation section 19, the disk 100 stores icon information about icon picture indicative of the corresponding operation mode. The icon picture is associated with the contents of the program picture. The icon information in the disk 100 is stored and held in the RAM area 15 or the FLASH area 16 as storage means connected via the data address bus 13. The stored icon information is held in the form of data directly accessible from the system controller 14.

The icon information possessed uniquely by a manufacturer when shipping of the recording medium reproducing apparatus 1 is stored in the ROM area 17. The icon information acquired by the system controller 14 from the disk 100 and once held, on the other hand, is stored in the RAM area 15 and the FLASH area 16. The icon information, which should continue to be stored even when the power of the recording medium reproducing apparatus 1 is turned OFF, is stored in the FLASH area 16. Further, the icon information, which should be refreshed and erased after the disk 100 is removed from the reproduction drive 2, is stored in the RAM area 15. In this connection, the RAM area 15 and the FLASH area 16 are required to be a volatile memory and a nonvolatile memory respectively.

The system controller 14 acquires, as necessary, the icon information from the ROM area 17, the RAM area 15, or the FLASH area 16. The icon information acquired by the system controller 14 is transmitted to the OSD plane (information display plane) 18. Thereafter, the video data stored in the video display plane 8, the sub-video data stored in the graphics plane 9, and the icon information stored in the OSD plane 18 are superimposed by the synthesizing device 10 to generate a superimposed video data. The superimposed video data is supplied to the video encoder 11, converted to an NTSC video signal therein, and then output therefrom.

In the first embodiment, the RAM area 15 and the FLASH area 16 are provided in the recording medium reproducing apparatus 1 so that the recording medium reproducing apparatus 1 can acquire the icon information from the disk 100 and store it in the RAM area 15 and the FLASH area 16. Further, in the first embodiment, the icon picture based on the stored icon information can be superimposed on the picture based on the video data of the video contents and the superimposed pictures are displayed by using the OSD plane 18.

In FIG. 1, both of the RAM area 15 and the FLASH area 16 are provided in the recording medium reproducing apparatus 1. However, the FLASH area 16 may not be provided and only the RAM area 15 may be provided. In this case, the icon information when a store enable flag 53 shown in FIG. 4, which will be described later, is enabled (savable) is stored in the RAM area 15.

Figure 2:
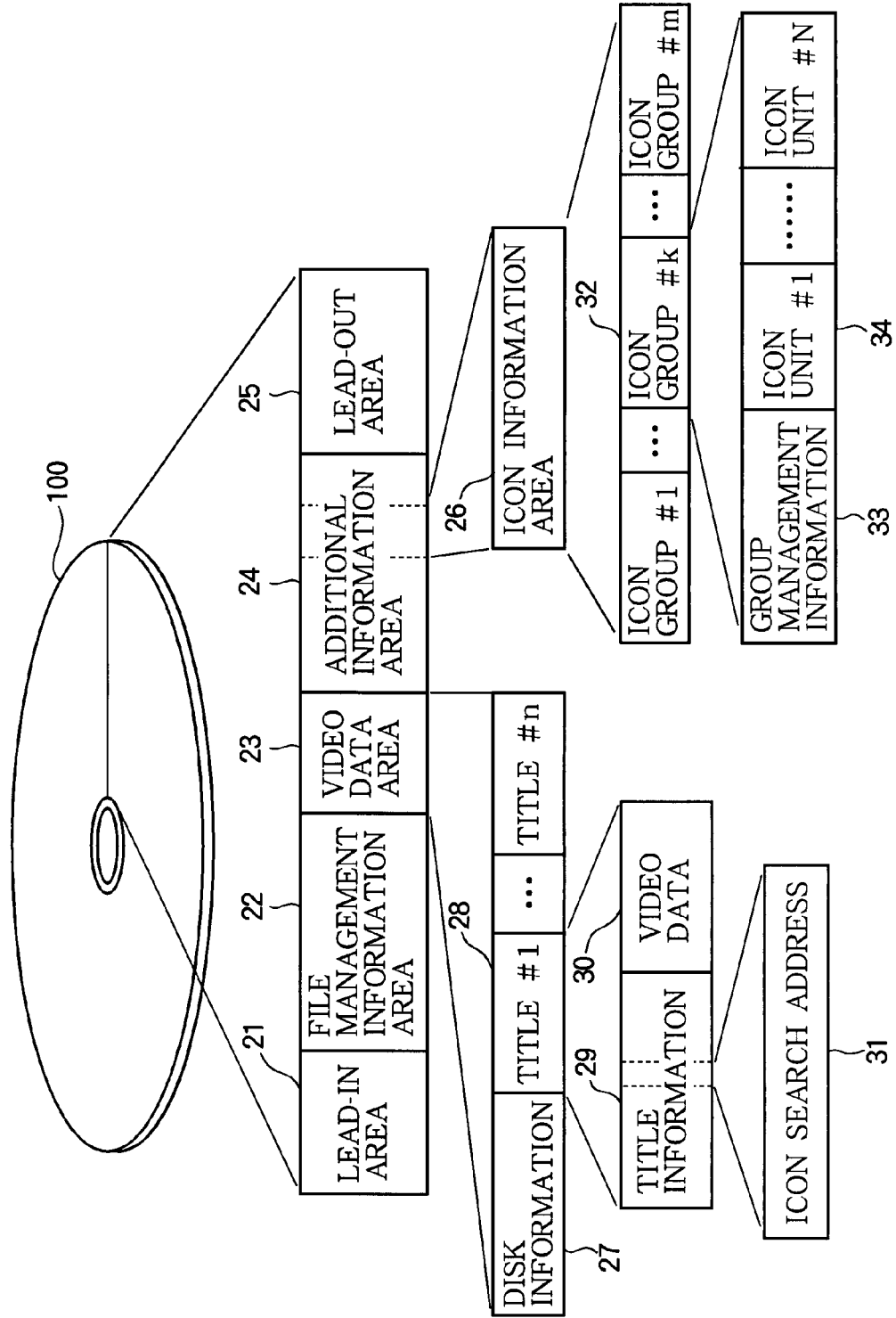
FIG. 2 is a diagram for explaining an example of an internal data structure of a DVD-ROM disk as a portable recording medium in the first embodiment.

FIG. 2 is a diagram for explaining an example of an internal data structure of the DVD-ROM disk 100 as a portable recording medium in the first embodiment. As shown in FIG. 2, the DVD-ROM disk 100 has, in order from a disk inner peripheral side to a disk outer peripheral side, a lead-in area 21, in which start information, physical characteristics and so on of the DVD-ROM disk 100 are recorded; a file management information area 22 for managing address information about file data of the DVD-ROM disk 100; a video data area 23, in which video data are previously recorded by a content supplier; an additional information area 24, in which extension information associated with the video data are held; and a lead-out area 25, in which disk termination information is recorded. The additional information area 24 includes icon information area 26 relating to an icon picture prepared by the content supplier of the disk 100.

Further, as shown in FIG. 2, the video data area 23 includes a single piece of disk information 27 containing the management information on the video data area 23 and one or more titles 28. The title 28 indicates a series of contents. FIG. 2 shows an example when the video data area 23 includes N titles of title #1, title #2, . . . , title #N. In the example shown in FIG. 2, title information 29 as content control information is recorded in a leading part (inner side) of each title 28, and video data 30 as title data is recorded in a rear part (outer side) of the title 28. However, the layout of the title information 29 and the video data 30 are not limited to the example shown in FIG. 2. For example, the title information 29 about all the titles 28 may be recorded together in the leading part of the video data area 23, and the video data area 23 may have another internal structure other than the above structure.

The title information 29 includes information about a program reproducing sequence, a control command to be executed after or before the reproduction of a program, and so on. More specifically, the title information 29 includes information about a control command to be first executed, information indicative of a section of the video data to be reproduced, and a rule indicative of the sequence of the reproduction of the sections. Further, information on the video data 30 is stream information about a program made up of video data, sub-video data, sound data and so on interleaved with one another. The title information 29 includes an icon search address 31, and stores an offset value (by the unit of sector or byte) from the leading end to an icon group 32 (to be described later) corresponding to the title in question. The icon search address 31 is used in the case of automatic downloading which will be described later. In this specification, the word "offset value (by the unit of sector or byte) from the leading end" means that, so long as the offset value is defined from a predetermined leading end position, the offset value may be expressed either by the unit of sector (e.g., relative logical sector address) or by the unit of byte. Further, the leading end position as a reference position may also be a position other than the already shown position. Furthermore, the icon search address 31 may be position information about an absolute sector address or the like.

As shown in FIG. 2, the icon information area 26 includes one or more icon groups 32. In the presence of a plurality of icon groups 32, a set of icon pictures of different types are stored in each icon group 32. For example, icon pictures about mainly animation characters are prepared in the icon group #1, and icon pictures about mainly animals are prepared in the icon group #2. A set of icon pictures associated with the video contents of each title 28 of the video data area 23 is stored in each icon group 32. However, one or more icon groups 32 may be provided for a single title 28, or the single icon group 32 may be provided for two or more titles 28. For example, when characters of 'dog' and 'cat' are present in the title #1, a set of 'dog' icon pictures is prepared in the icon group #1 and a set of 'cat' icon pictures is prepared in the icon group #2. In this connection, one or some of the titles 28 may not have the icon group or groups 32. In the case of automatic downloading to be described later, however, a single title corresponds to a single icon group 32.

As shown in FIG. 2, each icon group 32 includes a single piece of group management information 33 and one or more icon units 34. The single piece of group management information 33 includes information such as a total number of the icon units 34 or optimum conditions when each icon units 34 is read out in the recording medium reproducing apparatus 1. Further, the icon unit 34 has a single group of data for each of combinations of three conditions of the resolution of the recording medium reproducing apparatus 1, the number of colors displayable by the OSD plane 18, and the sizes of icons. In other words, the recording medium reproducing apparatus 1 holds a single icon unit 34 for each of setting conditions of a system H/W. When an icon picture is displayed in accordance with the operation mode, any of the icon pictures included in a single icon unit 34 is read out and displayed in accordance with the operation mode. In other words, a single icon unit 34 includes a single icon picture to be displayed for each operation mode, such as "PLAY", "STOP", and "PROHIBITED."

Figure 3:
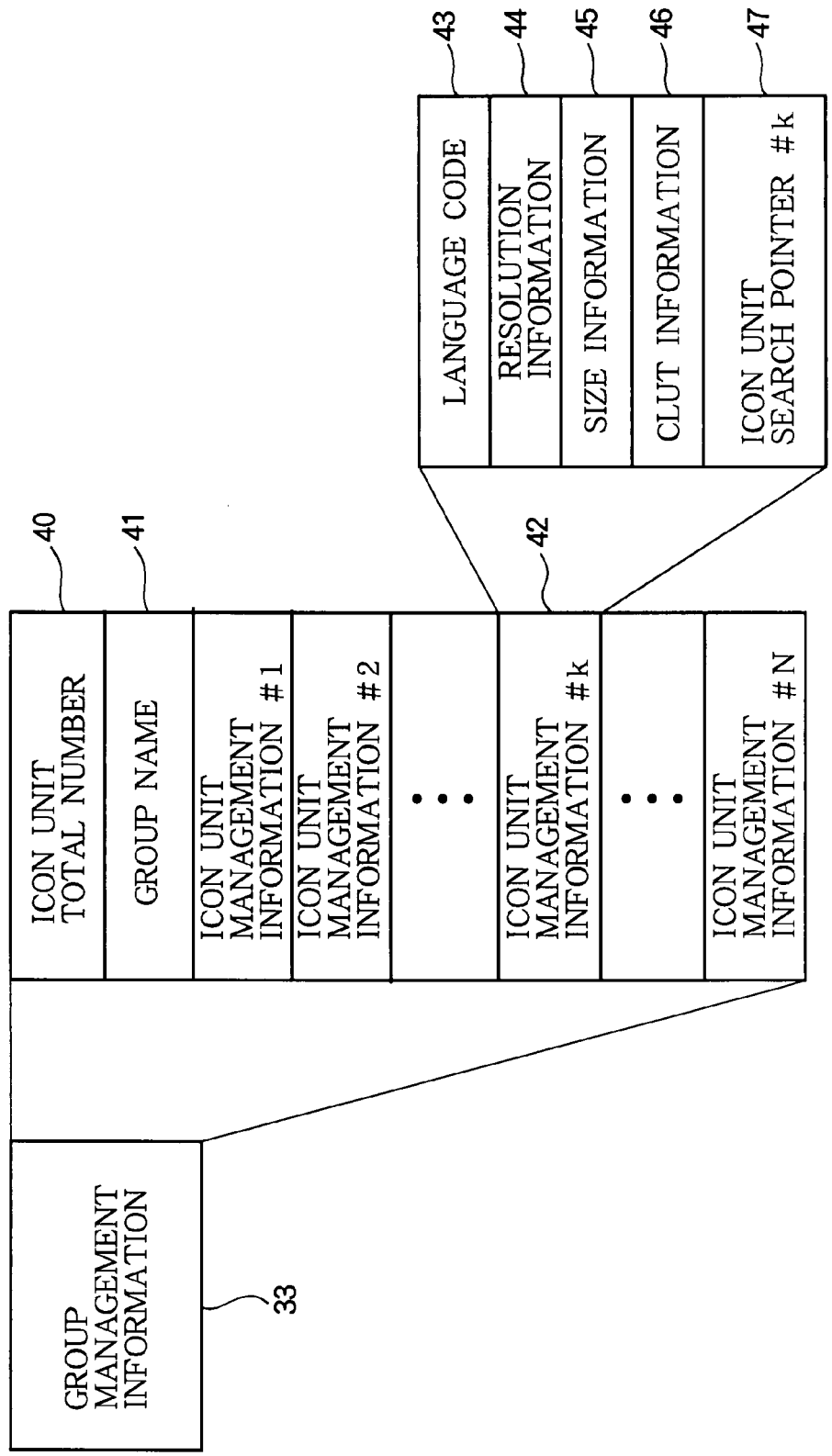
FIG. 3 is a diagram for explaining details of an internal data structure of group management information shown in FIG. 2.

FIG. 3 is a diagram for explaining details of an internal data structure of the group management information 33 shown in FIG. 2. As shown in FIG. 3, the group management information 33 includes a single icon unit total number 40, a group name 41, and one or more pieces of icon unit management information 42. The number of the icon units included in the icon group 32 is described in the icon unit total number 40. The group name 41 is a name of the icon group 32 and held as text information. Each of pieces of the icon unit management information 42 includes a language code 43, resolution information 44, size information 45, CLUT information 46, and an icon unit search pointer 47. Information included in each of pieces of the icon unit management information 42 indicates a combination of system setting information of the recording medium reproducing apparatus 1.

As the language code 43, a code indicative of country information associated with materials stored in the recording medium reproducing apparatus 1 is recorded. For example, when a video mode icon indicating "LOADING IN PROGRESS" is displayed, a code indicative of 'JAPAN' recorded in the language code 43 causes a Japanese sentence "YOMIKOMI-CHU (Loading in Progress)" to appear on the display screen as an icon picture. Further, a code indicative of the U.S.A. recorded in the language code 43 causes an English word "LOADING" to appear on the display screen as an icon picture.

The resolution information 44 is information for determining whether the resolution of the display device for the video signal to be output is SD (Standard Definition) or HD (High definition). Even when icon pictures have an identical number of pixels, one of the icon pictures displayed on a high resolution of the display device such as HD is displayed to be smaller than the other on a standard resolution of the display device. To this end, data of icon pictures of different sizes or data of icon pictures for different aspect ratios are required to be prepared in accordance with the display device, to which the icon picture is output. With regard to the resolution information 44, the user may set the resolution of the display device, or the resolution information 44 may be arranged to be automatically selected in accordance with the resolution of the OSD plane 18 included in the recording medium reproducing apparatus 1. When the resolution information 44 is arranged to be automatically selected in accordance with the resolution of the OSD plane 18 included in the recording medium reproducing apparatus 1, no information on a connected TV 84 is displayed on an initial setting menu display screen of FIG. 8, which will be described later.

The size information 45 is information indicating the size of the icon picture. The size of the display device to be used varies from user to user. When icon pictures having an identical number of pixels are used, the icon picture is displayed to be smaller on a small-sized monitor. For this reason, data are prepared so that the size of the icon can be set in accordance with user's preference.

The CLUT (Color Look-Up Table) information 46 is information for indicating the number of colors displayable by the OSD plane 18. For example, the number of colors is 64 k (64000), 256, 64, or other number. The number of colors expressible by the OSD plane 18 of the recording medium reproducing apparatus 1 depends on the system. Icon material image data using colors, the number of which exceeds the number of colors of the OSD plane 18 of the system not only needs an excessive amount of data more than necessary but also have a risk that makes it impossible to display colors, that the content supplier of the DVD-ROM disk 100 intended to display. For this reason, it becomes necessary to prepare the icon material image data in accordance with the number of displayable colors of the OSD plane 18 of the system.

Among each of pieces of the icon unit management information 42, the size information 45 and the language code 43 cannot be determined directly by the H/W system but can be set freely by the user. For this reason, as means for setting this information, such a mechanism as to set the above data by displaying a setting display screen as shown in FIG. 8, which will be described later, upon start of the H/W system may be provided. The icon unit search pointer 47 is expressed by a relative address when an address stored in the icon unit 34 corresponding to the icon unit management information 42 is expressed with the leading end position of the icon information area 26 as a reference position. Although description has been made in this example in connection with the case where the icon unit search pointer 47 is expressed by a relative address, the pointer may be expressed by an absolute address.

Figure 4:
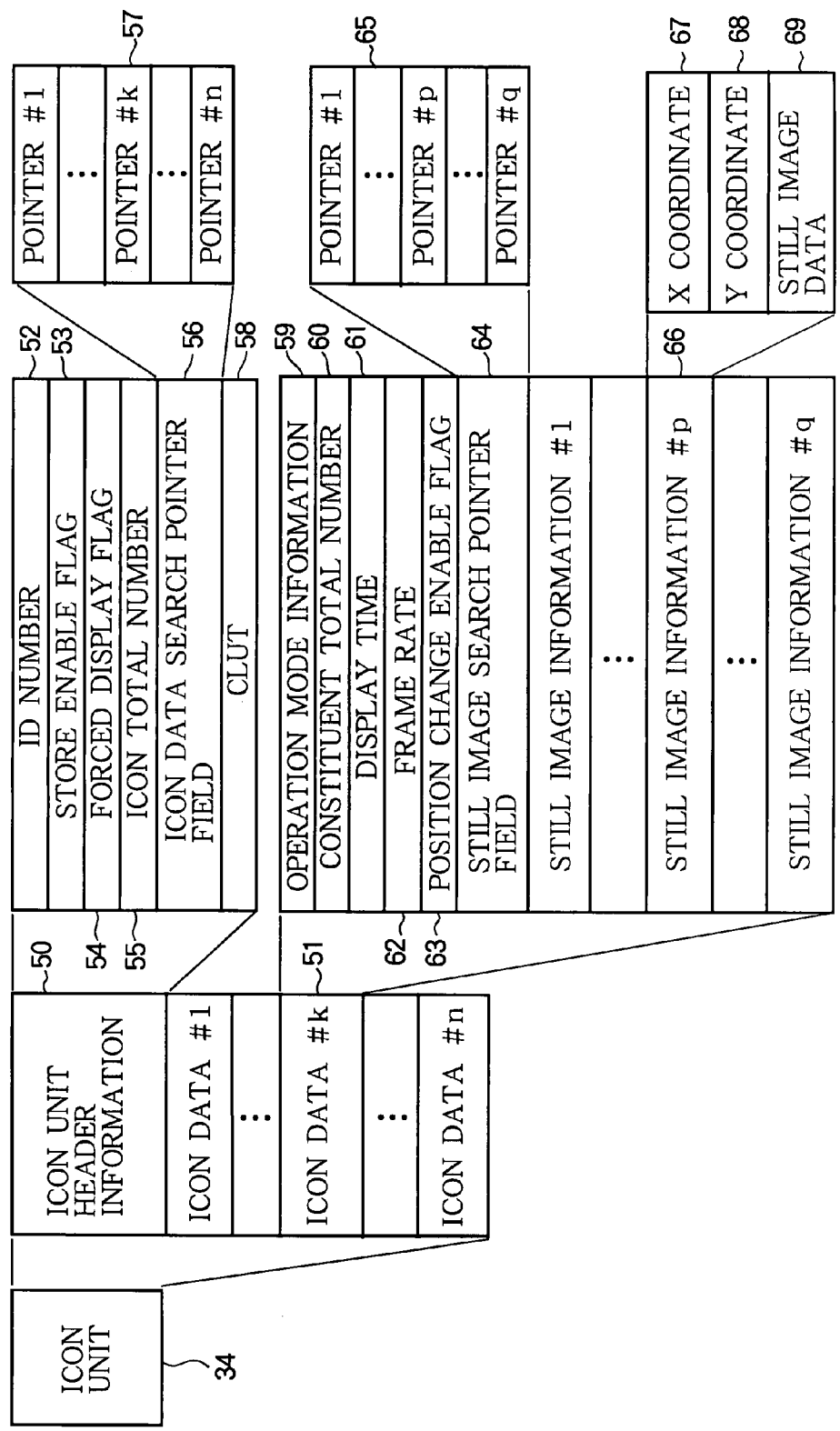
FIG. 4 is a diagram for explaining details of an internal data structure of an icon unit shown in FIG. 2.

FIG. 4 is a diagram for explaining details of an internal data structure of the icon unit 34 shown in FIG. 2. The icon unit 34 includes a single piece of icon unit header information 50 and a plurality of pieces of icon data 51. The icon unit header information 50 includes an ID number 52, a store enable flag 53, a forced display flag 54, an icon total number 55, an icon search pointer field 56, and a CLUT 58. A unique number for distinguishing among the icon units 34 is allocated to the ID number 52. With use of this ID number 52, the icon unit 34 to be stored in a memory area such as the RAM area 15 or the FLASH area 16 can be identified.

The forced display flag 54 is flag information used to forcibly select the icon of the operation mode being currently selected. By previously storing the forced display flag 54, the content supplier can transmit to the user the supplier's intention of wanting to display a specific icon picture. The store enable flag 53 is used to download the information of the icon unit 34 to be held in the FLASH area 16 of the recording medium reproducing apparatus 1 and to set whether or not the information of the icon unit 34 is to be continuously held when the DVD-ROM disk 100 is ejected. Due to the information of the store enable flag 53 previously stored, even the downloaded icon information can also be set advantageously not to be reused when another disk is loaded.

The field for the icon total number 55 stores the number of pieces of the icon data 51 held in the current icon unit 34. The icon search pointer field 56 has a plurality of pieces of pointer information 57 which are expressed by relative addresses when address information for accessing the respective icon data 51 are expressed with the leading end position of the icon unit 34 as a reference position. Although description has been made in this example in connection with the case where the address information for accessing the respective icon data 51 are expressed by relative addresses, the address information may be expressed by absolute addresses. The CLUT 58 is used as a color conversion table. The provision of the CLUT 58 enables still image data to be treated with less data quantity.

Further, the icon data 51 is an aggregation of video data and control data for each operation mode such as "PLAY (reproduction)", "FF (fast forward)" or "PROHIBITED." The icon data 51 includes a control data part which includes operation mode information 59, a constituent total number 60, a display time 61, frame rate information 62, a position change enable flag 63, and a still image search pointer field 64, and a video data part which includes a plurality of pieces of still image information 66.

The operation mode information 59 is information for identifying an operation mode shown by the icon data 51 and includes a code number for identifying the operation mode such as "PLAY (reproduce)" or "FF (fast forward)." The operation mode information 59 is, for example, a code number '001' corresponding to "PLAY (reproduce)" or a code number '002' corresponding to "STOP (halt)." In this manner, the code number is expressed by a numeric code for each operation mode. The constituent total number 60 is information for indicating the number of sheets of the still image information 66 included in a single piece of the icon data 51. For example, when the constituent total number 60 is one, the icon data 51 includes only one sheet of the still image information 66. Furthermore, when the constituent total number 60 is two or more, a plurality of sheets of the still image information 66 are switched with a specified time to provide a pseudo animation display. The display time 61 prescribes a time period during which the icon picture is displayed. The display time 61 is assumed to be settable in 256 levels from '00' to 'FF' in hexadecimal notation. When the display time is effective number information other than '00' and 'FF (=255)', the icon is displayed during a time period of seconds corresponding to the number information. For example, when the number information is set at twelve, the operation mode icon is displayed for 1 twelve seconds and thereafter the display is turned OFF. When the display time 61 is set at '00', the display continues to be displayed endlessly. When the display time 61 is set at 'FF (=255)', the display is carried out for a display time period originally held in the ROM area 17 of the recording medium reproducing apparatus 1. The frame rate information 62 indicates a changeover rate per unit time. For example, when the frame rate information 62 has a value of four, this means that changeover is carried out four times per second. That is, the larger a numeric value shown in the frame rate information 62 is, the smoother the animation display is.

The position change enable flag 63 is a flag used to set whether or not an icon is forcibly displayed at a location on the display screen which the downloaded data holds. The still image search pointer field 64 includes a plurality of pointers 65. The number of the pointers 65 is the same as the constituent total number 60, and the pointers 65 and the still image information 66 have a one-to-one correspondence. The still image information 66 includes position information about an X coordinate point 67 and a Y coordinate point 68 indicative of a display start position on the display screen, and also includes still image data 69 itself. The still image data 69 is held in a data format immediately before color conversion is carried out in accordance with the CLUT. In this connection, the still image information 66 may not include the still image data 69 and include only the position information about the X coordinate point 67 and the Y coordinate point 68. This case is, for example, that only the first still image information #1 includes the still image data 69 and the position information of the X coordinate point 67 and the Y coordinate point 68, and the subsequent still image information #2 and #3 are respectively arranged to use the same still image as a still image obtained by parallel-moving the still image of the still image information #1.

FIG. 5 is a diagram for explaining a relation between the group management information 33 and the icon unit header information 50 of the icon unit 34 in the first embodiment. Referring to this figure, the ID number 52 in the icon unit header information 50 is allocated for each combination of the system setting information of the recording medium reproducing apparatus 1. In other words, information on the icon unit 34 optimum for the combination of the system setting information is present for each ID number 52. For example, in the case of the group management information 33 shown in FIG. 5, the ID number 52 acquired when the system setting information of the recording medium reproducing apparatus 1 includes "LANGUAGE: JAPANESE (JP)", "RESOLUTION: HD", "NUMBER OF COLORS OF OSD: 256", and "ICON SIZE: LARGE", becomes #004.

Figure 6:
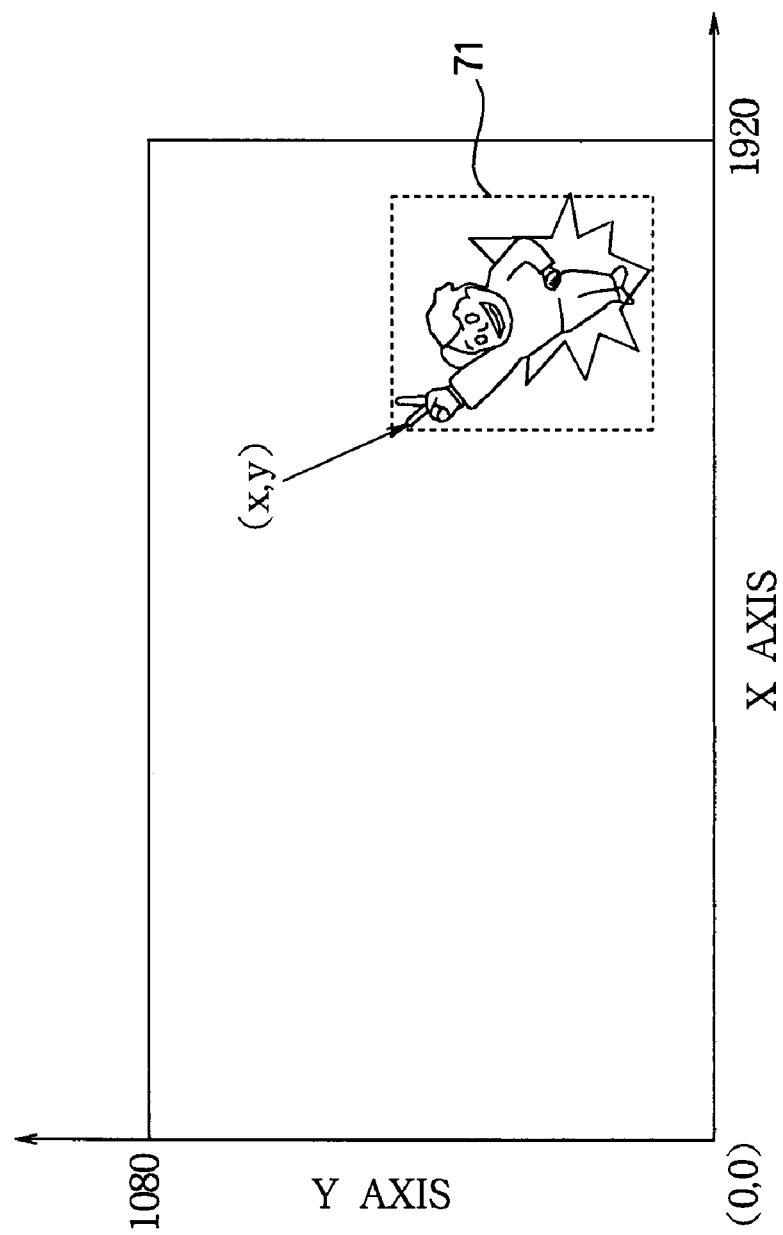
FIG. 6 is a diagram showing an example of an icon picture as a still picture displayed on the display screen of a display device.

FIG. 6 is a diagram showing a display example of an icon picture 71 as a still image on the display screen of the display device connected to the recording medium reproducing apparatus 1 in the first embodiment. This figure shows the icon picture when the display device has a resolution of HD (1920 pixels in horizontal direction×1080 pixels in vertical direction). This figure shows a position (of a coordinate (x, y)) specified by the X and Y coordinate points as a reference position and the icon picture 71 expanded form the reference position in a lower right direction.

Figure 7A:
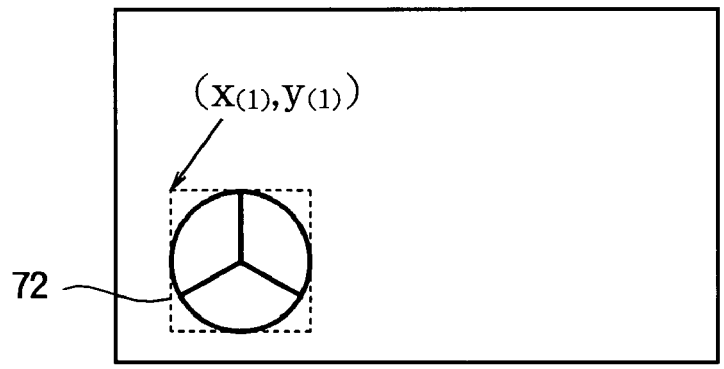
FIGS. 7A to 7C are diagrams each showing an example of an icon picture as a motion picture displayed on the display screen of the display device.
Figure 7B:
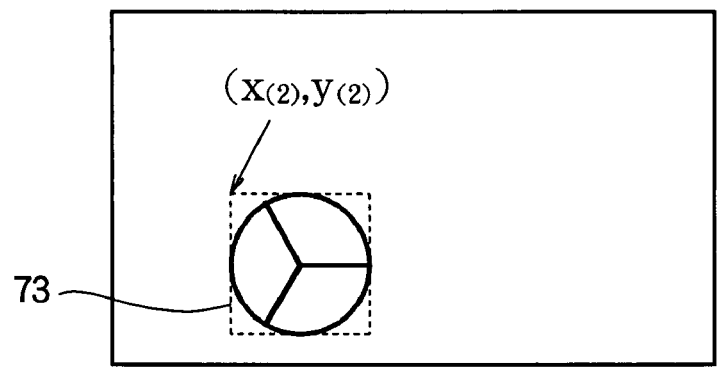
Figure 7C:
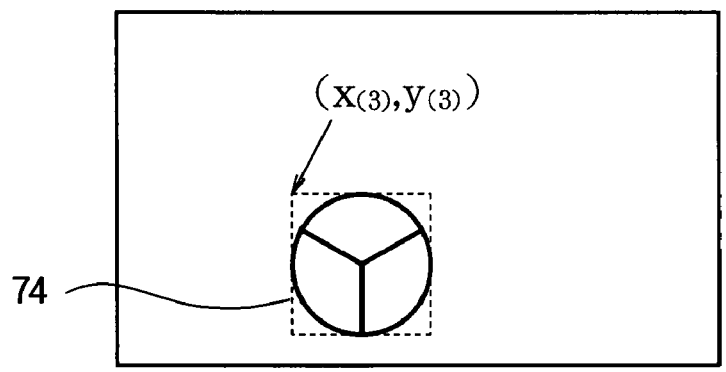

FIGS. 7A to 7C are diagrams showing a display example of an icon picture as a motion picture. The icon picture includes a plurality of still images, and it can be displayed by animation by switching between the still images at intervals of a unit time. In FIGS. 7A to 7C, the reference coordinate (x, y) and icon designs of the still image are changed as shown in FIGS. 7A to 7C in order of a still image 72 in FIG. 7A, a still image 73 in FIG. 7B, and a still image 74 in FIG. 7C. At this time, the entire icon design looks like revolving and moving. The details will be described as follows. As shown in FIG. 7A, the still image 72 having a reference coordinate $(x_{(1)}, y_{(1)})$ is first displayed. As shown in FIG. 7B, next, the reference coordinate of FIG. 7A is moved in the right direction to a reference coordinate $(x_{(2)}, y_{(2)})$ to display the still image 73 having such an icon design as rotated by 90 degrees clockwise. As shown in FIG. 7C, finally, the reference coordinate of FIG. 7B is moved in the right direction to a reference coordinate $(x_{(3)}, y_{(3)})$ to display the still image 74 having such a design as rotated by 90 degrees clockwise. As the three icon pictures are sequentially switched, it looks like the designs of the icon pictures were rotated and moved in the right direction to the user.

FIG. 8 is a diagram showing an example of an initial setting menu of the recording medium reproducing apparatus 1 appearing on the display screen of the display device connected to the recording medium reproducing apparatus 1. An initial setting menu 80 for the recording medium reproducing apparatus 1 has a configuration relating to icon downloading. Setting items include a language setting 82, an icon size 83, a connected TV 84, and a priority icon 85. The recording medium reproducing apparatus 1 acquires the optimum icon information on the basis of these items of information. The language setting 82 is a setting key used to select the language specification of the icon desired to be acquired by the recording medium reproducing apparatus 1. When the set value of the language setting 82 is set at Japanese, the icon picture is based on Japanese specification (e.g., Japanese subtitles being displayed), and the icon unit 34 containing the icon picture can be stored in the memory area. In the example shown in FIG. 8, switching can be made between four country specifications. However, additionally localized codes may be employed.

Further, in the example shown in FIG. 8, when one of the selection items of the icon size 83 is selected, the size of the icon to be stored in the memory area can be set in three levels. For example, when "LARGE" is selected in the selection items of the icon size 83, data for an icon having a large size can be acquired. When one of the selection items of the connected TV 84 is selected, a TV to be connected can be set. For example, when the recording medium reproducing apparatus is connected to an HDTV, "HD" is selected in the selection items of the connected TV 84; while, when the recording medium reproducing apparatus is connected to an SDTV, "SD" is selected in the selection items of the connected TV 84. An icon name to be preferentially displayed by the recording medium reproducing apparatus 1 is displayed on the priority icon 85. Further, an icon which the user wishes to display preferentially may also be selected by the user. The recording medium reproducing apparatus 1 can acquire information on a plurality of kinds of icon names, from which the user can select one icon character desired by the user to be first preferentially displayed. In this example, since letters (group name) based on the group name 41 (FIG. 3) of the icon group 32, the user can select one of the displayed group names. When the icon information indicates that the forced display flag 54 in FIG. 4 is enabled, however, even if the user selects another icon, the user's selection is ignored. Moreover, in FIG. 8, the group name 41 of the icon group 32 being currently selected during reproduction of the disk 100 is displayed in a selected icon name 86.

FIG. 9 is a diagram showing kinds and specifications of the icons as an example, as recommended examples of the number of icon constituents and the frame rates for different operation modes. In the example shown in FIG. 9, when an operation mode 90 is "PLAY (reproduce)", the number of icon constituents 91 is one, a frame rate 92 is not present (i.e., a still image), and a display time 93 is two seconds. For this reason, when the operation mode 90 is "PLAY (reproduce)", the icon is displayed by displaying a single still image for a time period of two seconds. When the operation mode 90 is "FF (fast forward)", "REW (rewind)", or "FORWARD SLOW (forward slow reproduction)", animation display rather than still image display can cause the user to recognize the icon more effectively. When the operation mode 90 is "FF (fast forward)" in the example shown in FIG. 9, the number of icon constituents 91 is five and the frame rate 92 is five frames/second. This means that five still images are sequentially displayed at a time interval of one second and are continuously displayed in the operation mode of "FF (fast forward)" (the display time 93 indicates Endless). Since the five still images are switchedly displayed with a short time interval, pseudo animation display can be achieved. A set of operation modes shown in FIG. 9 forms, for example, a single icon unit 34 (FIG. 2 and FIG. 4).

Figure 10A:
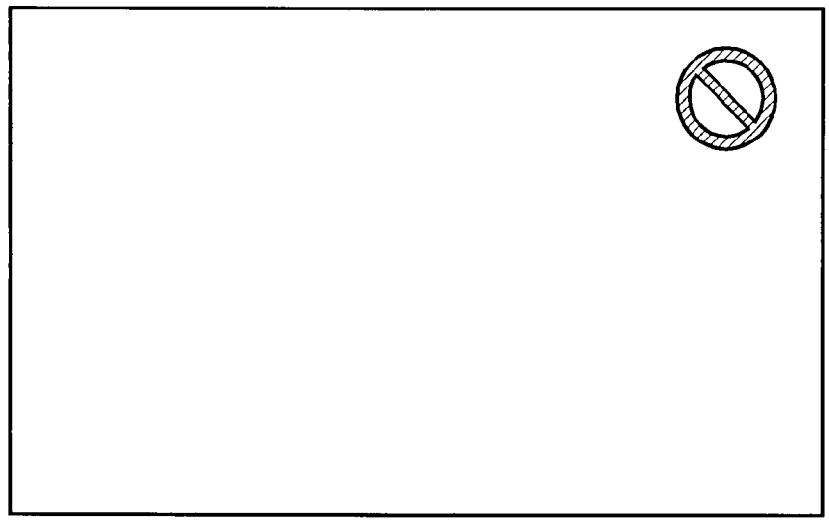
FIGS. 10A and 10B are diagrams each showing a display example of OSD in the first embodiment.
Figure 10B:
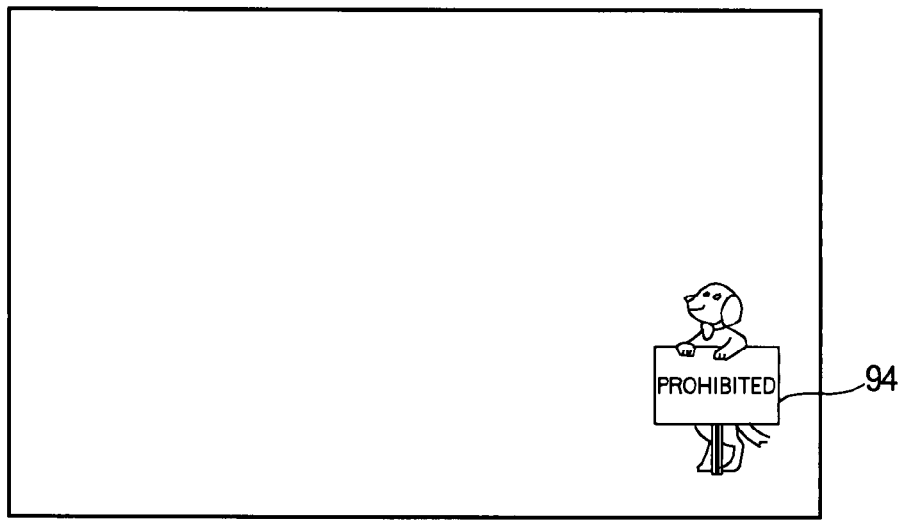

FIGS. 10A and 10B are diagrams each showing an example of an OSD displayed on the display screen of the display device connected to the recording medium reproducing apparatus 1 of the first embodiment. FIG. 10A shows an icon picture previously held in the ROM area 17 by the recording medium reproducing apparatus 1, and the icon picture includes an icon indicative of an operation mode when the user conducted a prohibited user operation. FIG. 10B shows a display example of the OSD based on the icon information obtained from the disk 100 and stored in the memory area as mentioned above, and the display example includes an icon indicative of an operation mode when the user conducted a prohibited user operation. Since the icon shown in FIG. 10B is based on the information obtained from the disk 100 and stored in the recording medium reproducing apparatus, the icon can have various characters or sizes. Further, since a plurality of pieces of still image information can be held for a single operation mode, sequential switching of the still images enables achievement of animation display.

FIG. 11 is a diagram showing an icon selection picture on the menu picture displayed on the display screen of the display device connected to the recording medium reproducing apparatus 1 of the first embodiment. When the disk 100 is inserted into the recording medium reproducing apparatus 1, a top menu 95 held in the title of the video data area 23 of the disk 100 is displayed on the display screen. The display of the top menu 95 is carried out according to the title information 29 as control information in the title 28 of the video data area 23 of the disk 100. The top menu 95 has four items of button information of "PLAY CONTENTS", "CHAPTER", "SET SUBTITLE", and "SET ICON". On the top menu 95, clicking of the "SET ICON" button causes an icon setting menu 96 to appear. The icon setting menu 96 is also held in the title of the video data area 23 of the disk 100. The icon setting menu 96 has six icon setting buttons, and different icons can be set individually by using the icon setting buttons. For example, the "ICON 1" button is an animation character icon for transmission of the animation character icon information, the "ICON 2" button is an animal character icon for transmission of the animal character icon information, and so on. In this way, the character information to be transmitted can be changed in accordance with the buttons. As a result, since the user can download an icon with simple operation such as selecting one of the buttons displayed on the display screen while viewing the icon setting menu 96, the setting operation can be facilitated.

A specific application image will be described below, assuming that the user clicks the "ICON 2" button among a plurality of types of selectable icons on the icon setting menu 96. The click of the "ICON 2" button causes information transmission 97 of the icon group 32 corresponding to the "ICON 2" button to start. When the information transmission 97 of the icon group is terminated, the aforementioned top menu 95 is displayed.

Figure 12:
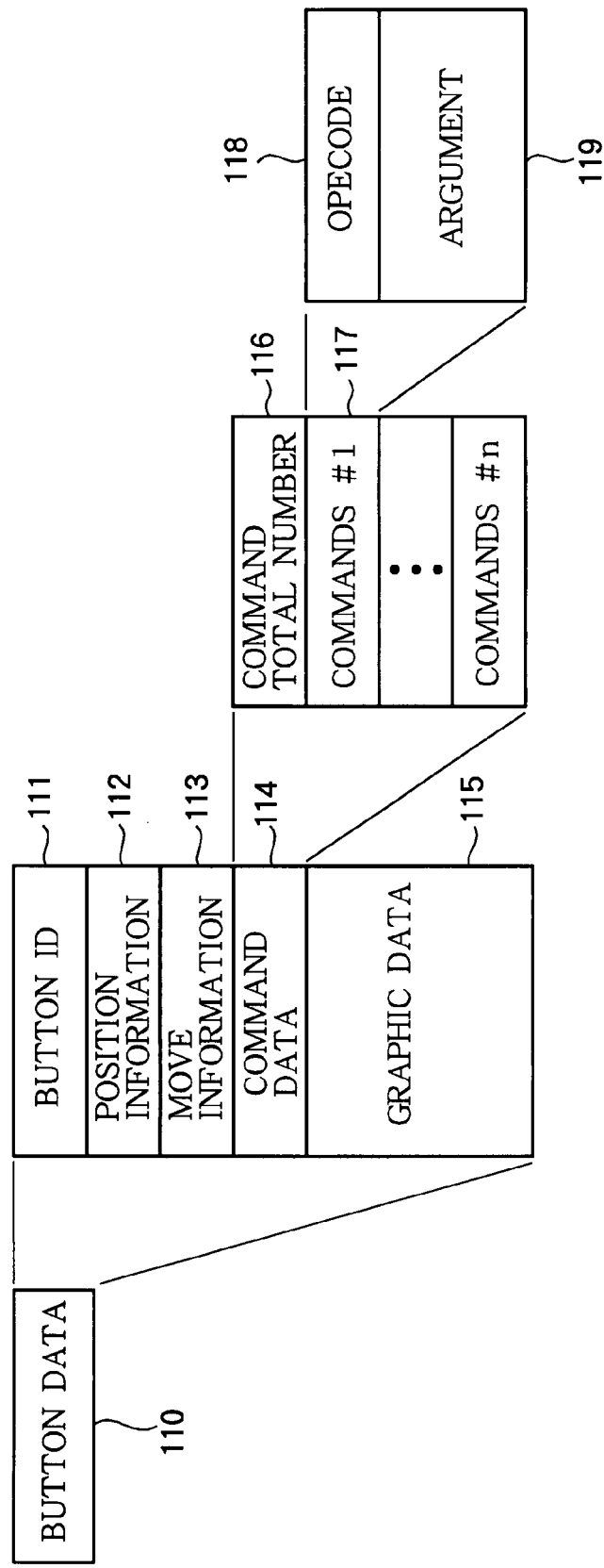
FIG. 12 is a diagram showing a data structure of button data in a top menu and in the icon setting menu.

FIG. 12 is a diagram showing a data structure of the button data on the top menu 95 and the icon setting menu 96 shown in FIG. 11. Each of the button data 110 includes a button ID 111, position information 112, move information 113, command data 114, and graphic data 115. A unique number for identifying the button itself is allocated to the button ID 111. The position information 112 indicates a coordinate of the position of the button in the display screen and a size of the button. The move information 113 indicates the button ID 111 as a highlight destination moved in accordance with information entered by the user via the user operation section 19. For example, when the user moves the highlight destination of the button from the "ICON 2" button to the "ICON 1" button using an up or down key of the user operation section 19, the button ID 111 of the "ICON 1" button as a move destination is indicated in the move information 113.

The command data 114 includes command information which defines the behavior of the recording medium reproducing apparatus 1 when the selection of the button is determined. A plurality of pieces of the command data 114 can be stored in the storage area of the command data 114. As shown in FIG. 12, a command total number 116 indicative of a total number of the commands 117, and the commands 117 are stored in the storage area, of the command data 114. In this connection, when a plurality of the commands 117 is stored, the commands are executed sequentially from the command #1. Each of the commands 117 has an opcode 118 and an argument 119. The opcode 118 indicates the type of a basic command, and the argument 119 is treated as a modifier of the opcode 118. The opcode 118 may include "jump command" or "set command." For example, for the data structure of the "jump command", a bit train indicative of the "jump command" is recorded in the opcode 118, and "title number" is held in the argument 119. When the "jump command" is executed by the jump command button, control is transited to the title number held in the argument 119 and the reproduction of this title starts. In the present invention, "download command" (icon data transmission command) for identifying a command which transmits the icon information to the recording medium reproducing apparatus 1 is held in the opcode 118 of the command 117 of the button data 110, whereas "download target data address" is held in the argument 119.

Figure 13:
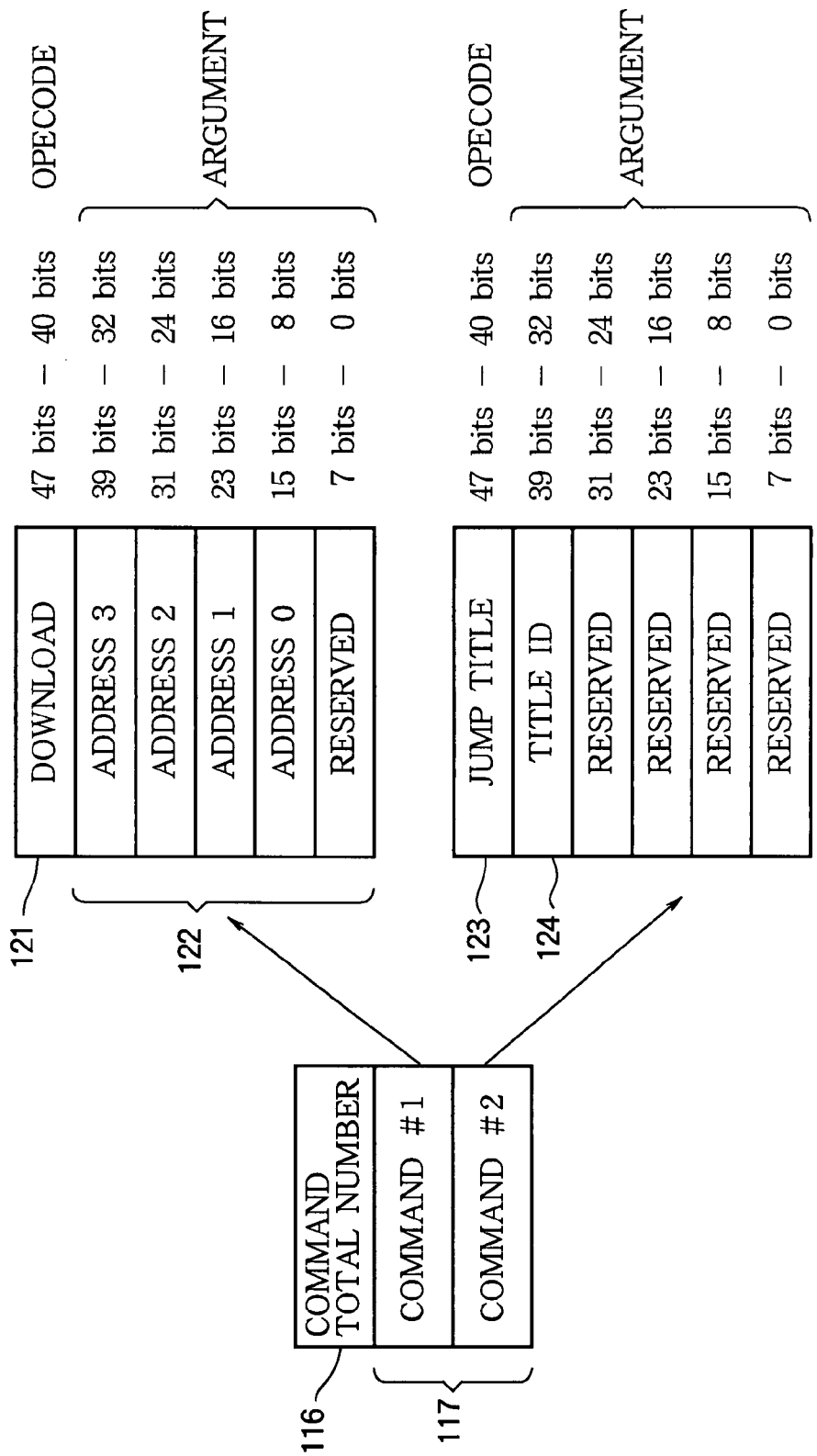
FIG. 13 is a diagram showing specific data array information based on button data commands.

FIG. 13 is a diagram showing specific data arrangement information of the command data 114 of the button data 110 shown in FIG. 12. In this example, data is arranged for the application image corresponding to the example shown in FIG. 11. A total number of the commands indicated by the command total number 116 is two. The command #1 (reference numeral 170) first to be executed is a download command 121, and the command #2 to be next executed (reference numeral 170) is a jump title command 123. The download command 121 is expressed as a code indicative of the download command in the opcode 118 (47 bits to 40 bits). Thereafter, the storage destination of the icon group 32 for information acquisition of the recording medium reproducing apparatus 1 is stored as an address 122 in the argument 119 (39 bits to 0 bits) and more specifically, as offset values (by the unit of sector or byte) from the leading end. The execution of the download command 121 causes the icon group 32 to be transmitted. Thereafter, the jump title command 123 as the command #2 is executed. The command is described in the opcode 118 (47 bits to 40 bits) as a code indicative of the jump title command. Next, title ID information 124 is stored in the argument 119 (39 bits to 0 bits) as a jump destination, and thus a jump to the specified title is executed. In this case, the ID number of the title for displaying the top menu 95 is stored as the title ID 124.

Referring to FIG. 1 to FIG. 13 described above, description will be made as to a processing flow from the acquisition of the icon information from the DVD-ROM disk 100 to the storage of the icon information in a memory area such as the RAM area 15 or the FLASH area 16. As the downloading method, two schemes of "automatic scheme" and "manual scheme" are prepared. In the "automatic scheme", when the disk 100 is inserted into the recording medium reproducing apparatus 1, the processing from the information acquisition to the storing operation thereof into the memory area in the apparatus is fully automatically carried out. In the "manual scheme", the user can freely set the type, size and so on of the icon. In the manual scheme, in general, downloading is started by the user who clicking a button in the icon setting menu 96 (FIG. 11) of the disk 100.

First, the acquisition of the icon information in the "manual scheme" will be described concretely. Further, the operation until the execution of a button command selected in the icon setting menu 96 will be described. When the automatic reproduction of the title 28 is executed upon insertion of the DVD-ROM disk 100 into the recording medium reproducing apparatus 1, the top menu 95 is displayed on the display device. The top menu 95 is displayed in the form of a combination of video data and sub-video data. The video data means background image information of the top menu 95 on the display screen, and the sub-video data means button information displayed to be overlapped with the video data. In FIG. 11, clicking of the "SET ICON" button causes the top menu 95 to be changed to the icon setting menu 96 stored in the disk 100.

In the icon setting menu picture 96 of the disk 100, six items of the button information is held as the sub-video data. The button information may include one or more icons. The buttons are used to acquire information about one of the buttons selected by the user. In the icon setting menu picture 96, the button being currently selected is highlighted. In FIG. 11, the "ICON 2" button is highlighted. At this time, the highlighted button can be moved by the user who clicks a right arrow key, a left arrow key, an up arrow key, or a down arrow key (not shown). Further, clicking of a decision key (not shown) of the user operation section 19 causes the command allocated to the highlighted button to be executed.

Each of the buttons is associated with the button data 110 shown in FIG. 12, the command data 114 allocated to each button can have a plurality of the commands 117, and these commands are executed sequentially from the command #1. In the first embodiment, as shown in FIG. 13, the download command (icon data transfer command) for setting the download of the icon information is prepared as the command allocated to the button. In FIG. 13, the command #1 is first executed. Since a bit train indicative of the download command 121 is allocated to the command #1, the command #1 is decided as the download command 121. Thereafter, the argument 119 (a part from 39 bits to 0 bits) of the download command 121 is acquired. Since the address 122 of the icon group 32 having the icon information to be transmitted stored therein is included in the argument 119, information about the icon group 32 is transmitted to the recording medium reproducing apparatus 1 and the system controller 14 acquires the information.

Next, description will be made as to the internal processing data of the recording medium reproducing apparatus 1 after a button command indicative of the download command 121 is executed and then the icon group 32 specified by the button command is acquired. A schematic flow of the internal processing operations is set in accordance with a routine which follows.

Step ST1: The apparatus executes the download command in response to the clicking of the button command.

Step ST2: The apparatus acquires information on the icon group 32 from the icon information area 26 of the additional information area 24.

Step ST3: The apparatus acquires system setting information of the recording medium reproducing apparatus 1.

Step ST4: The apparatus identifies the optimum icon unit 34 from the icon group 32 on the basis of the system setting information.

Step ST5: The apparatus checks information about the downloading scheme (download destination and icon forcible selection).

Step ST6: The apparatus stores the icon unit 34 in the RAM area 15 or the FLASH area 16.

Step ST7: The apparatus changes the use icon.

Since the above-mentioned steps ST1 and ST2 have already been described, the steps ST3 and ST4 will be described below. The system controller 14 acquires system setting information, which includes setting conditions for selecting a use icon in the recording medium reproducing apparatus 1, such as "LANGUAGE SETTING", "OUTPUT RESOLUTION", "NUMBER OF COLORS OF OSD", and "ICON SIZE" of the recording medium reproducing apparatus 1 itself. Information about "LANGUAGE SETTING" and "ICON SIZE" are previously selected and determined arbitrarily by the user in the initial setting menu 81 of FIG. 8, and the set contents are stored as preference information of the apparatus. The "LANGUAGE SETTING" is expressed by a three-digit numeral code indicative of the country, and, as an example, '001' indicates "JAPAN" and '002' indicates "U.S.A." The "ICON SIZE" is expressed, for example, by three levels of size information in a two-bit data area. The "ICON SIZE" indicates "LARGE" when '00b' is set for the icon size, indicates "MEDIUM" when '01b' is set for the icon size, and indicates "SMALL" when '11b' is set for the icon size. The "OUTPUT RESOLUTION" can be switched, for example, between two levels of information in a two-bit data area. That is, '01b' set for the output resolution indicates "HD" and '00b' set for the output resolution indicates "SD." Since the "NUMBER OF COLORS OF OSD" is information included in the recording medium reproducing apparatus 1 itself, it eliminates the need for the user to set it and is identified as H/W system information of the recording medium reproducing apparatus 1 itself. For example, the "NUMBER OF COLORS OF OSD" is expressed as information having a two-bit data width. More specifically, the "NUMBER OF COLORS OF OSD" is switched between '00b' indicating 64-color display, '01b' indicating 256-color display, and "10b" set therefore indicates 64 k-color display.

The first embodiment shows an example when the language setting is set at '001' (i.e., JAPANESE), the output resolution is set at '01b' (i.e., HD), the number of colors of OSD is set at '10b' (64 k COLORS), the icon size is set at '00b' (i.e., LARGE). First of all, from the group management information 33 of the acquired icon group #2, the apparatus sequentially search the icon units 34 for the optimum icon unit 34 based on the above system setting information. More specifically, from the group management information 33 (FIG. 3) of the icon group #2, the icon unit 34 having the same information as the code system of the "LANGUAGE SETTING", "OUTPUT RESOLUTION", "SIZE INFORMATION", and "CLUT INFORMATION" in the system setting information is identified. The ID number satisfying the aforementioned conditions is ID number #004 from FIG. 5, so that, when the ID number #004 is selected, the optimum storage in the memory area is estimated to be achieved. Since the icon unit search pointer 47 of the icon unit #004 is also written in the icon unit management information 42 (FIG. 3) with respect to the ID number #004, the position of the icon unit #004 can be identified. The icon unit #004 has data indicative of the icon information optimum for the set information by the disk supplier.

Next, the above-mentioned step ST5 will be described. The system controller 14 checks the store enable flag 53 and the forced display flag 54 in accordance with the icon unit header information 50 of the acquired icon unit 004. When the store enable flag 53 of the icon unit #004 indicates "enable (savable)", the system controller determines that the icon data should be stored in the FLASH area 16 of the recording medium reproducing apparatus 1. When the store enable flag 53 indicates "disable (unsavable)", the system controller determines the icon information should be stored in the RAM area 15 of the recording medium reproducing apparatus 1. When the forced display flag 54 of the icon unit #004 indicates "enable", the currently-stored icon is forcibly applied. When the forced display flag 54 indicates "disable", not the currently-stored icon but an icon which is set to be displayed as the priority icon 85 of the initial setting menu 81 of FIG. 8 is applied as a result. In the first embodiment, description will be made in connection with a case where the store enable flag 53 is set at "disable" and the forced display flag 54 is set at "enable."

Finally, the above-mentioned steps ST6 and ST7 will be described. Since the store enable flag 53 is set at "disable", the RAM area 15 is selected as the memory area as its storage destination. The storing is performed in the RAM area 15 via the data address bus 13. After the storing operation is normally terminated, the system executes the next step ST7. Since the store enable flag 53 is set at "enable" in the step ST7, the currently-stored icon is forcibly applied and the icon is displayed by top priority until the disk opening/closing operation is conducted.

Description will be made as to how icon information stored in the memory area flows and is displayed. Its schematic flow is as follows.

Step ST8: The apparatus sets a route of the data address bus 13 between such a memory area as the RAM area 15 or the FLASH area 16 and the system controller 14, in accordance with the basis of system setting value (the priority icon 85 and the selected icon name 86 in FIG. 8) information.

Step ST9: The apparatus acquires the corresponding icon unit 34 (animal icon, animation icon, or the like) from a memory area such as the RAM area 15 or the FLASH area 16.

Step ST10: The apparatus acquires the icon data 51 of the operation mode (PLAY, STOP, or the like) to be currently displayed.

Step ST11: The apparatus acquires display conditions information (the constituent total number 60, the frame rate information 62, or the like in FIG. 4).

Step ST12: The apparatus displays the icon picture (transforms the color by the CLUT 58 and switches by the frame rate information 62).

The detailed operation of the first embodiment will be described below. Description will be made on the assumption that icon information is already stored in the RAM area 15. That is, it is assumed that the icon unit 34 (refer to FIG. 4) is stored in the RAM area 15. In the operation mode which will be described below, when operation of a target is carried out during a prohibition period of the user operation, the system controller 14 acquires the icon data 51 of the target operation mode from the icon unit 34 stored in the RAM area 15.

The above-mentioned steps ST8 and ST9 will first be described. The system controller searches for the storage location of the icon unit 34 being currently selected. If the currently-set icon unit 34 is stored in the RAM area 15, the system controller 14 switches the status of the apparatus to put the data address bus 13 between the system controller 14 and the RAM area 15 in a communicatable state. If the icon unit 34 being currently selected is stored in the FLASH area 16, the system controller 14 switches the status of the apparatus to put the data address bus 13 between the system controller 14 and the FLASH area 16 in an uncommunicatable state. It is assumed that the system controller 14 can access the icon unit 34 thereafter. With respect to the icon unit 34 being selected, when the forced display flag 54 is "disable" and the priority icon 85 is set by the initial setting menu 81 of FIG. 8, the system controller searches for the storage location of the icon unit 34 having the priority icon 85 set therein.

Next, the step ST10 will be described. On the basis of the pointer information 57 of the icon search pointer field 56 stored in the icon unit header information 50, the system controller 14 acquires the operation mode information 59 of all the icon data 51. The system controller compares the operation mode information 59 of all the icon data 51 with the operation mode being currently operated, and acquires all the icon data 51 whose operation mode information 59 coincides with (whose operation mode information is "prohibition").

Next, the step ST11 will be described. The system controller 14 next acquires information about the constituent total number 60 and the frame rate information 62 in the icon data 51. Description will be made in the first embodiment on the assumption that the information about the constituent total number 60 and the frame rate information 62 in the icon data 51 are already set at such a number of icon constituents 91 and a frame rate information 62 as shown in FIG. 9. In the example shown in FIG. 9, in the prohibited user operation mode, the number of icon constituents 91 is set at three and the frame rate 92 is set at three frames/second. Based on the above set values, the icon data 51 has a total of three sheets of still image information that are the still image information #1, #2, and #3, and is displayed by switching between these three still images. In this connection, the image switching is carried out in a cyclic display (in an order of #1, #2, #3, #1, #2, . . . ) Each of the still image information 66 has position information of the X coordinate point 67 and the Y coordinate point 68, which is not limited to the fixed display.

The step ST12 will finally described. After the position of the icon picture to be displayed and the refreshing timing are determined, actual display is achieved. The system controller acquires the CLUT 58 in the icon unit header information 50, and provides actual display of a code indicative of CLUT of the still image data 69 based on the CLUT 58 as the color conversion look-up table information in the icon unit header information 50. The icon display is continued until it comes to the display time 93 in the icon data 51 or until the user finishes the corresponding operation.

The download of the automatic scheme will next be described. When the DVD-ROM disk 100 is inserted into the recording medium reproducing apparatus 1, the system controller 14 acquires number information about the title 28 described in the disk information 27 of the video data area 23 to be first reproduced. On the basis of the number information of the title 28, the title 28 is reproduced. Description will be made in the first embodiment on the assumption that the title #1 is the title 28 to be first reproduced.

The title information 29 of the title #1 includes the icon search address 31. The icon search address 31 includes an offset value (by the unit of sector or byte) from a leading end position of the written icon group 32 desired to be transmitted to the recording medium reproducing apparatus 1. On the basis of the icon search address 31, the system controller acquires the icon group 32 from the icon information area 26. The processing operations after this are the same as processing steps in the manual scheme. In this way, on the basis of the system setting information of the recording medium reproducing apparatus 1, the system controller can extract the optimum icon information and automatically download it. Thus, by using the optimum icon information together with the forced display flag 54, the system controller can display an icon picture of a character coinciding with or associated with the intended contents of the contents supplier, which is transparent to the user. Further, since the downloading can be attained automatically, a danger of erroneous setting by the user can be minimized.

As has been described above, in the recording medium reproducing apparatus 1 of the first embodiment, on the basis of the display capability of the OSD plane 18 or on the basis of the display capability of the display device connected to the recording medium reproducing apparatus 1, icon information stored in the OSD plane 18 is selected from the icon information stored in the RAM area 15 or in the FLASH area 16 and is displayed on the display device connected to the recording medium reproducing apparatus 1. Thus, the icon to be displayed can have a suitable size.

Further, in the recording medium reproducing apparatus 1 of the first embodiment, the downloaded icon information is held in the OSD plane 18 provided for state display and the video contents themselves to be reproduced from the DVD-ROM disk 100 is held in the video display plane 8. Thus, an icon based on the downloaded icon information can be displayed on the display device while avoiding degradation of the display quality of the video to be displayed on the basis of the video contents and while avoiding complication of the arrangement of the recording medium reproducing apparatus.

Furthermore, when a portable recording medium 101 of the first embodiment is used, the execution of the icon data transfer command advantageously causes icon information to be automatically downloaded to the recording medium reproducing apparatus.

Second Embodiment

Figure 14:
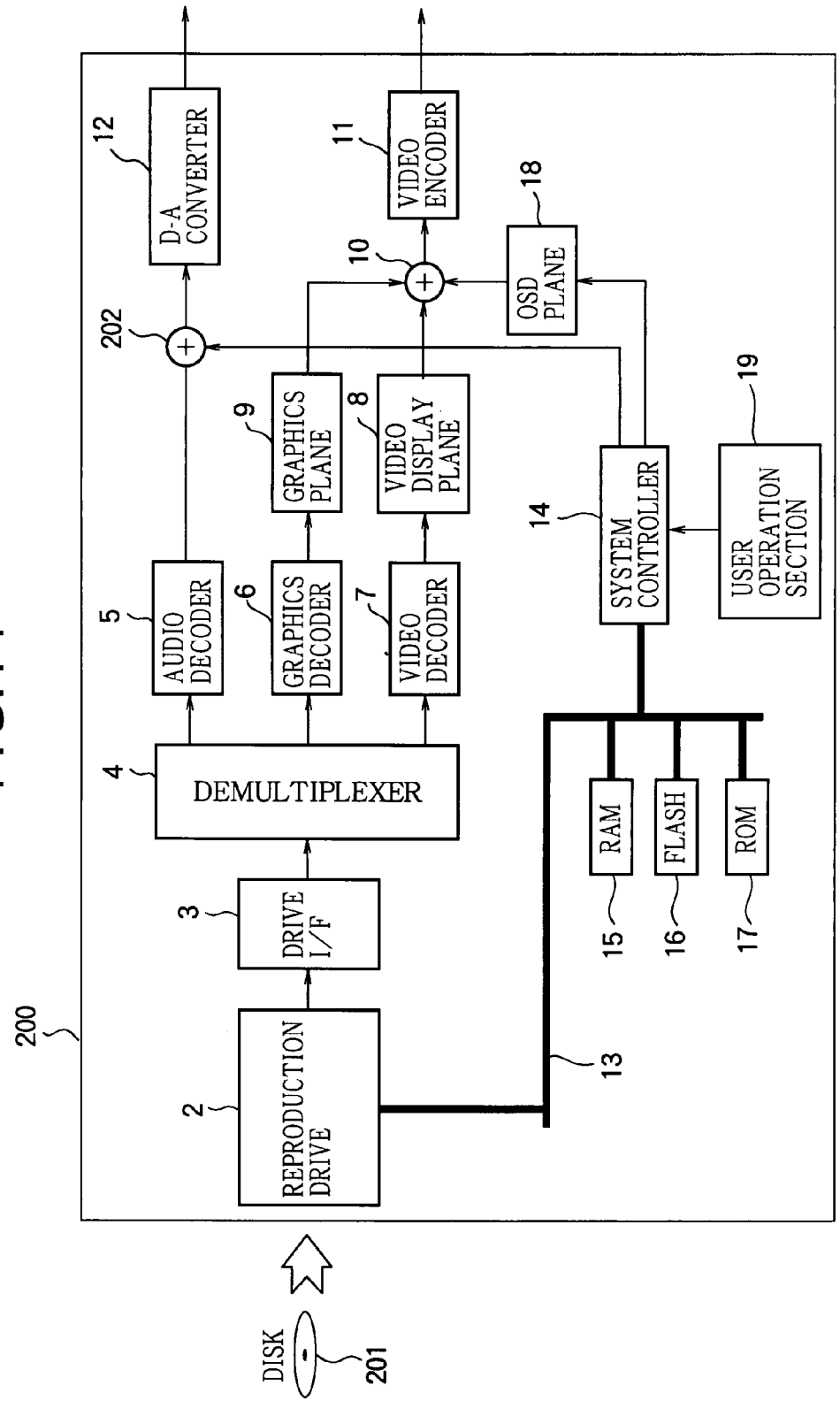
FIG. 14 is a block diagram showing an arrangement of a recording medium reproducing apparatus according to the second embodiment of the present invention.

FIG. 14 is a block diagram showing an arrangement of a recording medium reproducing apparatus 200 according to the second embodiment. The recording medium reproducing apparatus 200 of the second embodiment is an apparatus that can execute the recording medium reproducing method of the present invention. In FIG. 14, constituent elements that are the same as or correspond to those in FIG. 1 are assigned the same reference numerals. In the second embodiment, icon information relating to an icon picture indicative of the operation mode for user operation to the recording medium reproducing apparatus 1 and sound information are previously stored in the optical disk 201. In FIG. 14, the icon information indicative of the operation mode and the sound information output as accompanied by the icon picture to be displayed on the basis of the icon information in a disk 201 are stored in a memory area such as the RAM area 15 or the FLASH area 16 connected with the system controller 14 and the drive I/F 3 via the data address bus 13 or the like provided between the system controller 14 and the drive I/F 3. The information stored in the memory area is stored as data directly accessible by the system controller 14. Basically, the storage destination of the sound information is the same as the storage destination of the icon information. In other words, when the icon information is recorded in the RAM area 15, the sound information is also recorded in the RAM area 15. Even in the case of the FLASH area 16, the same holds true. That is, when the icon information is recorded in the FLASH area 16, the sound information is also recorded in the FLASH area 16. For operations other than the storing operation of the sound information, the recording medium reproducing apparatus 200 performs operations substantially the same as the DVD-ROM disk 100 of the first embodiment.

The system controller 14 acquires icon information as necessary from each memory area in the same manner as the first embodiment. The icon information acquired by the system controller 14 is transmitted to the OSD plane 18 as an OSD frame memory area. Thereafter, three pieces of video data, that is, video data output from the aforementioned video display plane 8, video data of the graphics plane 9, and icon picture data of the OSD plane 18, are combined in the synthesizing device 10 to multiplex these videos. The video data generated in the synthesizing device 10 is supplied to the video encoder 11, converted to an NTSC video signal thereby, and then output as a video. Even for the sound information, the system controller 14 similarly acquires the sound information as necessary from the memory area. The sound information acquired by the system controller 14 is mixed in a sound mixer 202 with the sound data output from the audio decoder 5, supplied to the D-A converter 12, converted to an analog sound signal thereby, and then output therefrom. In the second embodiment, the RAM area 15 and the FLASH area 16 can be provided in the recording medium reproducing apparatus 200, icon information and sound information can be acquired from the DVD-ROM disk 201 and stored therein, the stored icon information can be displayed as an icon picture through the OSD plane 18 in accordance with the operation mode, and a sound associated with the operation mode can be output during the display of the icon picture. With respect to operations other than the output of the sound information, the recording medium reproducing apparatus 200 of the second embodiment performs operations substantially the same as the first embodiment. In this connection, as the sound information, sound information associated with the video contents of the disk 201, for example, the same or similar sound as or to a specific sound recorded in a movie, may be previously stored.

Figure 15:
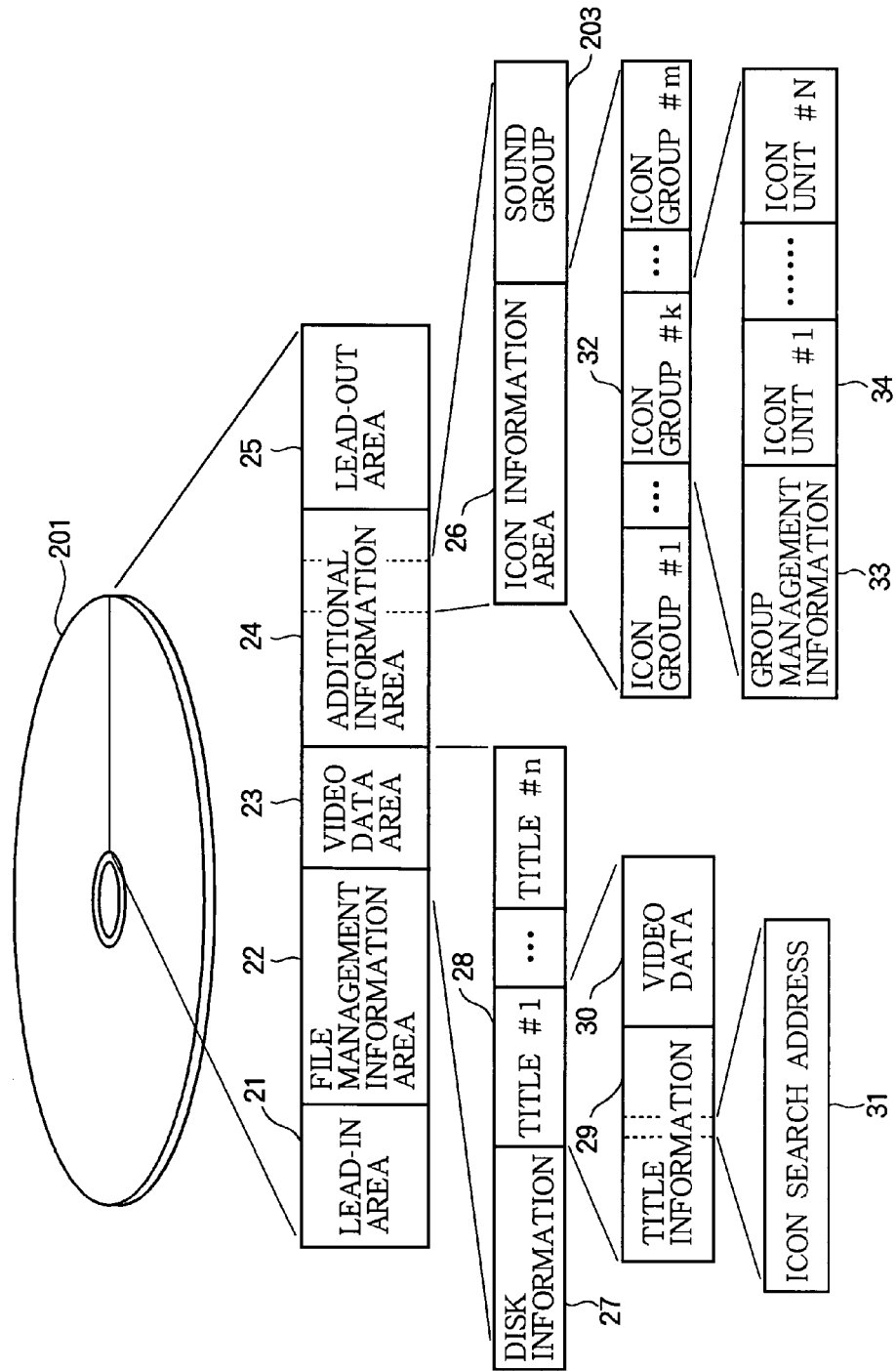
FIG. 15 is a diagram for explaining an example of an internal data structure of a DVD-ROM disk as a portable recording medium in the second embodiment.

FIG. 15 is a diagram for explaining an example of an internal data structure of the DVD-ROM disk 201 as a portable recording medium in the second embodiment. In FIG. 15, constituent elements having the same or corresponding functions as those in FIG. 2 are denoted by the same reference numerals. As shown in FIG. 15, icon information 26 having download data of an icon picture prepared by the contents supplier, and a sound group 203 having the download data of the sound associated with the operation mode, are recorded in an additional information area 24 of the DVD-ROM disk 201. The DVD-ROM disk 201 of the second embodiment is the same in data structure as that of the recording medium reproducing apparatus 1, except for the aforementioned data structure.

Figure 16:
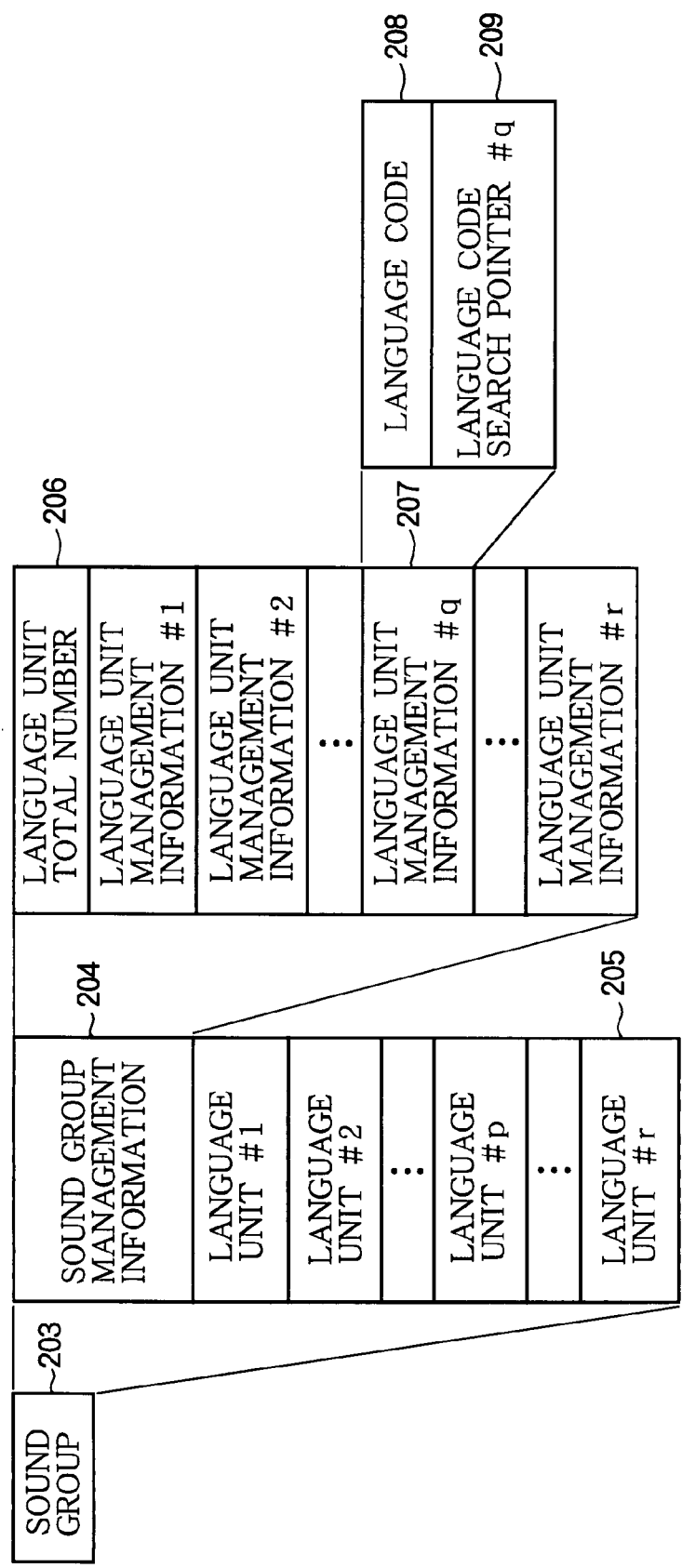
FIG. 16 is a diagram for explaining details of an internal data structure of a sound group shown in FIG. 15.

FIG. 16 is a diagram for explaining details of the internal data structure of the sound group 203 shown in FIG. 15. As shown in FIG. 16, the sound group 203 includes a single piece of sound group management information 204 and one or more language units 205. The sound group management information 204 includes a single language unit total number 206 and one or more pieces of language unit management information 207. Management information of the language units 205 is stored in the language unit management information 207, and the number of pieces of the language unit management information 207 is the same as the number of the language units 205.

The language unit management information 207 includes a language code 208 and a language unit search pointer 209. A code number indicative of a country is described in the language code field 208. A code number is described in the language code field 208. For example, '001' is described in the language code field 208 as a code number indicative of Japan, or '002' is described in the language code field 208 as a code number indicative of the U.S.A. The language unit search pointer 209 is position information for identifying each language unit 205, and an offset value (by the unit of sector or byte, with respect to the data leading end address of the sound group 203 as a reference position) from the leading end is described in the language unit search pointer field 209.

Figure 17:
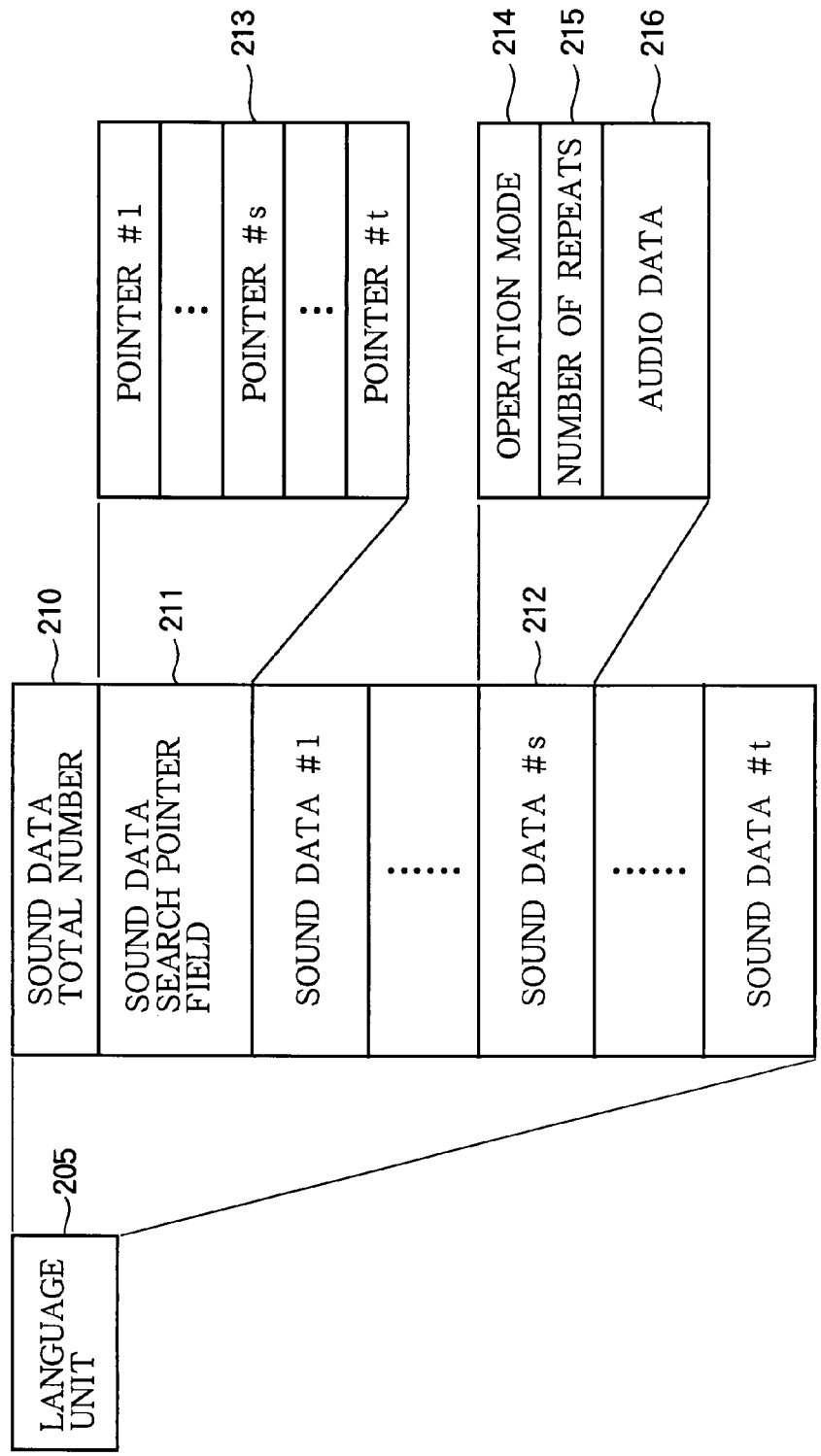
FIG. 17 is a diagram for explaining details of an internal data structure of a language unit shown in FIG. 16.

FIG. 17 is a diagram for explaining details of the internal data structure of the language unit 205 shown in FIG. 16. As shown in FIG. 17, the language unit 205 includes a sound data total number 210, a sound data search pointer field 211, and one or more pieces of sound data 212. The sound data total number 210 indicates a total number of pieces of the sound data 212 held by the language unit 205. The sound data search pointer 211 includes one or more pointers 213, and the pointer 213 identifies the sound data 212. An offset value (by the unit of sector or byte, with the data leading end address of the sound group 203 as a reference position) from the leading end is included in the sound data search pointer field 211. The number of the pointers 213 of the sound data search pointer field 211 is the same as the number of pieces of the sound data 212. The language unit 205 forms a group of pieces of data for each language code 208. When sound information is audibly output in accordance with the operation mode, any of pieces of the sound data 212 included in the language unit 205 is read out in accordance with the operation mode and audibly output. That is, the language unit 205 includes zero or one-by-one pieces of the sound data 212 to be output for the operation mode of PLAY, STOP, PROHIBITED and so on The language unit 205 corresponds to the icon unit 34 described in the first embodiment.

The sound data 212 includes an operation mode 214, a number of repeats 215, and audio data 216. The operation mode 214 indicates the operation mode for user operation toward the recording medium reproducing apparatus 1. A code number for identifying "PLAY(reproduce)" or "FF (fast forward)" is recorded in the operation mode field 214. That is, a numeric value code for each operation mode, for example, a code number '001' indicative of "PLAY (reproduce)" or a code number '002' indicative of "STOP", is recorded in the operation mode field 214. The number of repeats 215 indicates how many times the audio data 216 is to be reproduced. When the number of repeats 215 is a valid number other than '00', the repeat reproduction is carried out by a number of times corresponding to the number information. For example, when twelve is set as the number of repeats 215, the audio data 216 is reproduced twelve times and terminated. When '00' is set as the number of repeats 215, the reproduction is reproduced to be repeated endlessly. However, it is basically assumed that the audio data 216 includes sound data of the main body attached to an icon of a still image or moving picture to be displayed on the display screen, and is output only when the operation mode icon is displayed. It is assumed in this example that the audio data 216 is recorded based on the linear PCM (pulse code modulation). However, the audio data 216 may be recorded based on another sound formatting system such as Dolby AC-3 or DTS.

Figure 18:
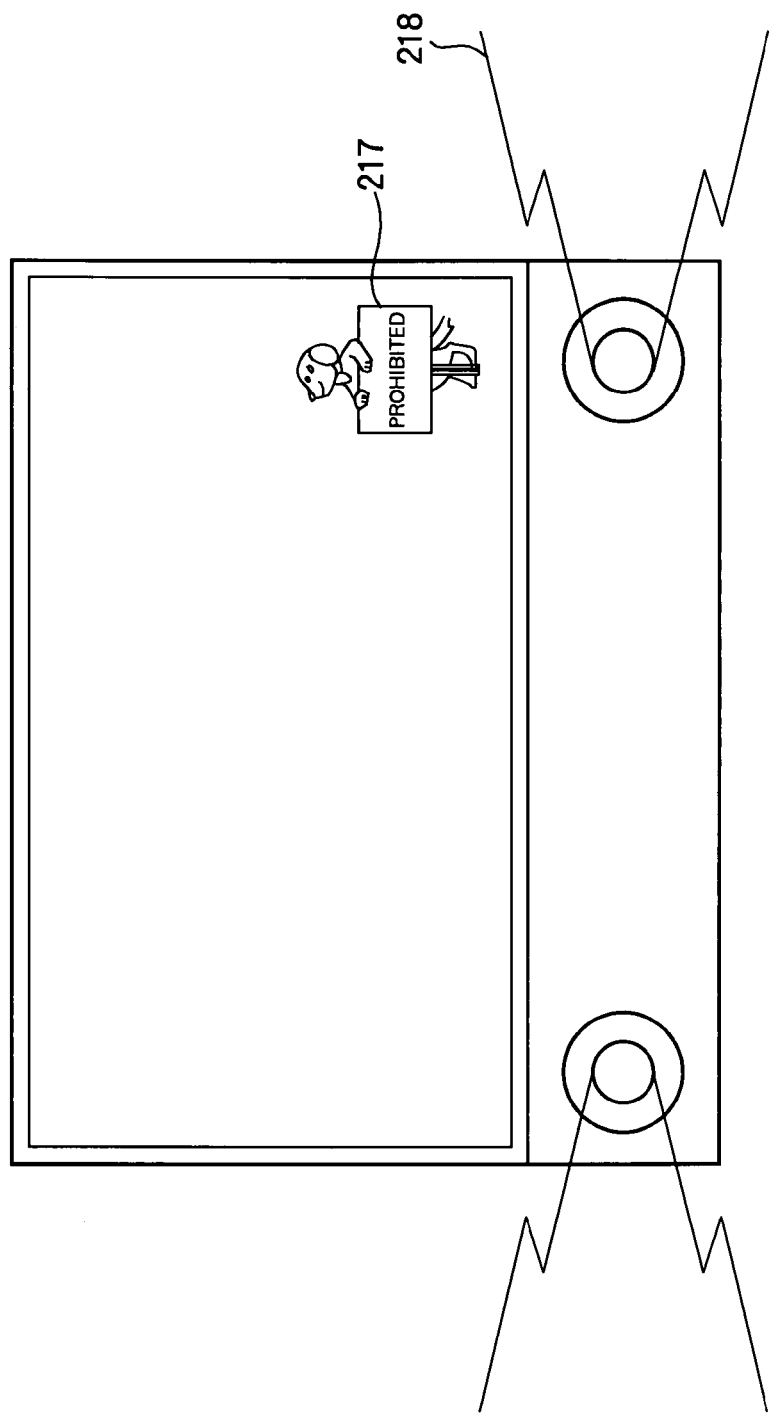
FIG. 18 is a diagram showing a display example of an OSD in the second embodiment.

FIG. 18 is a diagram showing an example of the OSD display in the second embodiment when icon information is acquired from the portable recording medium 201 and stored in the memory area. FIG. 18 shows an icon picture 217 and a sound 218 (for example, sounding "this operation is prohibited.") accompanied and generated thereby appeared when the user conducts prohibited user operation through the user operation section 19. Data relating to the icon picture 217 and the sound 218 is acquired from the disk 201 and stored in the recording medium reproducing apparatus 200. As has been described in the first embodiment, icons stored in the recording medium reproducing apparatus 200 include various forms or sizes of characters. Further, since a plurality of pieces of still image information can be held for a single operation mode, animation display can be achieved by sequentially switching between the still images. The sound information is output in combination with such an icon display. A display time for the icon picture 217 may be set to be different from an output time for the sound 218.

A flow until storing the icon information and the sound information obtained from the DVD-ROM disk 201 is the same as that in the first embodiment, and therefore the same description is omitted here. In this connection, the downloading method has two schemes of "automatic scheme" and "manual scheme" in the same manner as the first embodiment.

Description will be as to details of internal processing data in the recording medium reproducing apparatus 200 after the command data 114 of the download command 121 (refer to FIG. 13) is executed to acquire the icon group 32 specified by the command data 114. The internal processing flow is set in accordance with a routine which follows as a general flow.

Step ST1: The apparatus executes the download command by clicking the button command.

Step ST2: The apparatus acquires information about the icon group 32 from the icon information area 26 of the additional information area 24.

Step ST3: The apparatus acquires system setting information of the recording medium reproducing apparatus 1.

Step ST4-1: The apparatus identifies the optimum icon unit 34 from the icon group 32 on the basis of the system setting information. Further, the apparatus identifies the language unit 205 from the sound group 203.

Step ST5: The apparatus checks information about the download scheme (download destination and icon forced selection).

Step ST6-1: The apparatus stores the icon unit 34 and the language unit 205 in the RAM area 15 or the FLASH area.

Step ST7: The apparatus changes the use icon.

The steps ST1 to ST3, ST5, and ST7 are substantially the same as those in the first embodiment and therefore the same description is omitted here. Description will next be made as to the step ST4-1.

The second embodiment shows an example when the language setting is set at '001' (i.e., JAPANESE), the output resolution is at '01b' (i.e., HD), the number of colors of OSD is at '10b' (i.e., 64 k), and the icon size is at '00b' (i.e., LARGE). First of all, the apparatus sequentially searches for the optimum icon unit 34 based on the above system setting information from the group management information 33 of the acquired icon group #2. More specifically, the apparatus identifies the icon unit 34 having the same information as the code format of the "LANGUAGE SETTING", "OUTPUT RESOLUTION", "SIZE INFORMATION", and "CLUT INFORMATION" in the system setting information from the group management information 33 of the icon group #2. As an ID number satisfying the above conditions, when the ID number #004 from the correlation of FIG. 5, the ID number is estimated to be stored in the optimum memory area. Since the icon unit search pointer 47 of the icon unit #004 is recorded in the ID number #004 field, the apparatus can identify the position of the icon unit #004. The icon unit #004 has data indicative of the icon information optimum for the system setting information of the disk supplier.

Similarly, the apparatus sequentially searches the sound group 203 for the optimum language unit 205 based on the above system management information. More specifically, the apparatus identifies the language unit 205 having the same information as the language code format of the language setting (FIG. 8) in the system setting information from the sound group 203 on the basis of the language code 208 in the sound group management information 204. Even for the sound information, the apparatus can identify the position of the language unit 205 having a language code format indicative of Japanese on the basis of the language unit search pointer 209.

Description will next be made as to the step ST6-1. Since the store enable flag 53 in the icon unit header information 50 of the icon unit 34 is set at "disable", the RAM area 15 is selected as the memory area of the storage destination. The data is stored in the RAM area 15 via the data address bus 13. The stored data are the icon unit 34 and the language unit 205 specified in the step ST4-1. After the storage is normally terminated, the next step ST7 is executed.

Description will be made as to a flow in which the icon information stored in the memory area is displayed in the second embodiment. Its schematic flow is as follows.

Step ST8: The apparatus sets a route of the data address bus 13 between a memory area such as the RAM area 15 or the FLASH area 16 and the system controller 14 on the basis of system set value (priority icon 85 and the selected icon name 86 in FIG. 8) information.

Step ST9-1: The apparatus acquires the corresponding icon unit 34 (animal icon, animation icon and so on) from a memory area such as the RAM area 15 or the FLASH area 16. The apparatus also acquires the language unit 205 of the sound information associated with the icon.

Step ST10-1: The apparatus acquires the icon data 51 and the sound data 212 for the operation mode (PLAY, STOP and so on) to be currently displayed.

Step ST11: The apparatus acquires display conditions information (the constituent total number 60, the frame rate information 62 and so on in FIG. 4).

Step ST12-1: The apparatus displays the icon picture (Performs color conversion based on the CLUT 58 and switches at the frame rate 62). The apparatus also outputs the audio data 216.

The steps ST8 and ST11 are substantially the same as those in the first embodiment and therefore the same description is omitted here.

Description will be made on the assumption the icon information has been already stored in the RAM area 15. That is, it is assumed that the icon unit 34 (refer to FIG. 4) and the language unit 205 are stored in the RAM area 15. When a target operation is carried out during a prohibition period of user operation as the operation mode to be described below, the system controller 14 acquires the icon data 51 and the sound data 212 for the target operation mode from the icon unit 34 stored in the RAM area 15.

Description will be made as to the step ST9-1. The system controller searches for the storage location of the icon unit 34 being currently selected. If the icon unit 34 and the language unit 205 being currently set are stored in the RAM area 15, the system controller 14 switches the status of the apparatus to put the route of the data address bus 13 between the system controller 14 and the RAM area 15 in the communicatable state. If the icon unit 34 and the language unit 205 being currently selected is stored in the FLASH area 16, the system controller 14 switches the status of the apparatus to put the route of the data address bus 13 between the system controller 14 and the FLASH area 16 in the uncommunicatable state. Thereafter, the icon unit 34 and the language unit 205 can be accessed by the system controller 14.

Next description will be made as to the step ST10-1. The system controller 14 acquires the operation mode information 59 of all the icon data 51 on the basis of the pointer information 57 in the icon data search pointer field 56 held in the icon unit header information 50. The system controller 14 compares the operation mode information 59 of all the icon data 51 with the operation mode being currently operated, and acquires the entire icon data 51 having the coincided operation mode information 59 (whose operation mode information is "prohibition"). Simultaneously, the system controller 14 acquires the operation mode 214 of all the sound data 212 on the basis of the pointer information 213 in the sound data search pointer field 211. The system controller 14 compares the operation mode 214 of all the sound data 212 with the operation mode being currently operated, and acquires the entire sound data 212 having the coincided operation mode 214 (whose operation mode information is "prohibition").

Finally description will be made as to the step ST12-1. After the display position of the icon picture and the refreshing timing are determined, the display is actually made. The system controller acquires the CLUT 58 in the icon unit header information 50, sends a code indicative of CLUT of the still image data 69 to the CLUT 58 as color conversion look-up table information in the icon unit header information 50, and then provides actual display. The icon display is continued until it comes the display time 93 in the icon data. The audio data 216 is also output. The audio data 216 is reproduced by a number of times corresponding to the number of repeats 215 of the sound data 212 during the icon display. When the icon display is terminated before the reproduction frequency reaches the number of repeats 215, the sound output is also terminated together therewith.

As has been described above, according to the recording medium reproducing apparatus 200 of the second embodiment, an icon to be displayed can have a suitable size, in the same manner as the first embodiment. In the same manner as the first embodiment, according to the recording medium reproducing apparatus 200 of the second embodiment, an icon based on the downloaded icon information can be displayed on the display device, while avoiding degradation of quality of a picture displayed based on the video contents and also avoiding complication of the recording medium reproducing apparatus.

Further, when the portable recording medium 201 in the second embodiment is used, the execution of the icon data transfer command advantageously causes the icon information to be automatically downloaded to the recording medium reproducing apparatus.

Third Embodiment

Figure 19:
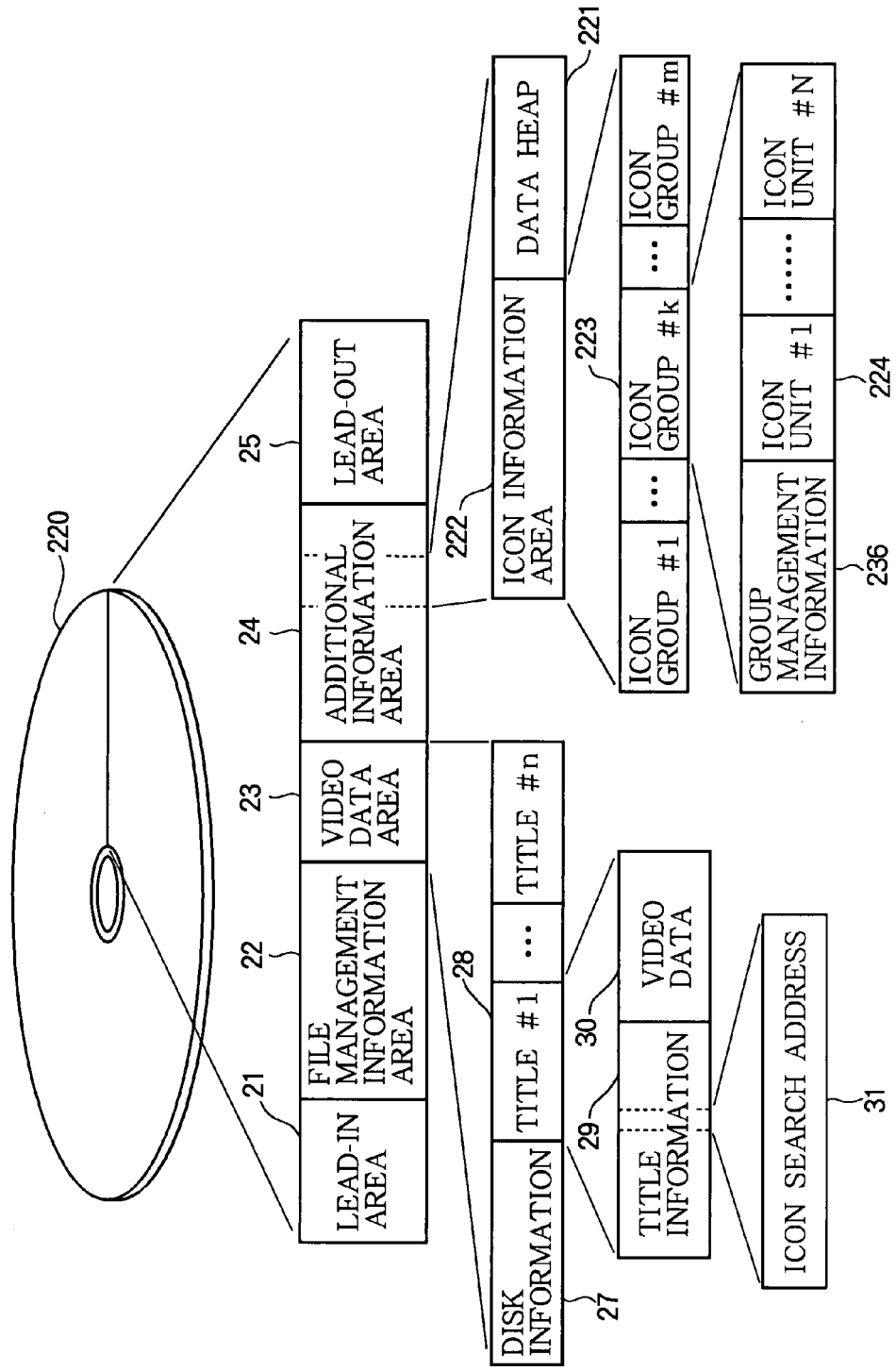
FIG. 19 is a diagram for explaining an example of an internal data structure of a DVD-ROM disk as a portable recording medium in the third embodiment of the present invention.

FIG. 19 is a diagram for explaining an example of an internal data structure of a DVD-ROM disk 220 as a portable recording medium in the third embodiment. The constituent elements in FIG. 19 that are the same as or correspond to those in FIG. 2 are assigned the same reference symbols. As shown in FIG. 19, in the DVD-ROM disk 220, the additional information area 24 includes not only an icon information area 222 but also a data heap 221 for integrally managing the main data such as an operation mode icon, sound data and CLUT prepared by the contents supplier. The icon information area 222 includes one or more icon groups 223. Each icon groups 223 includes group management information 236 and one or more icon units 224. Other data structure of the DVD-ROM disk 220 in the third embodiment is substantially the same as the data structure of the DVD-ROM disk 100 in the first embodiment.

Figure 20:
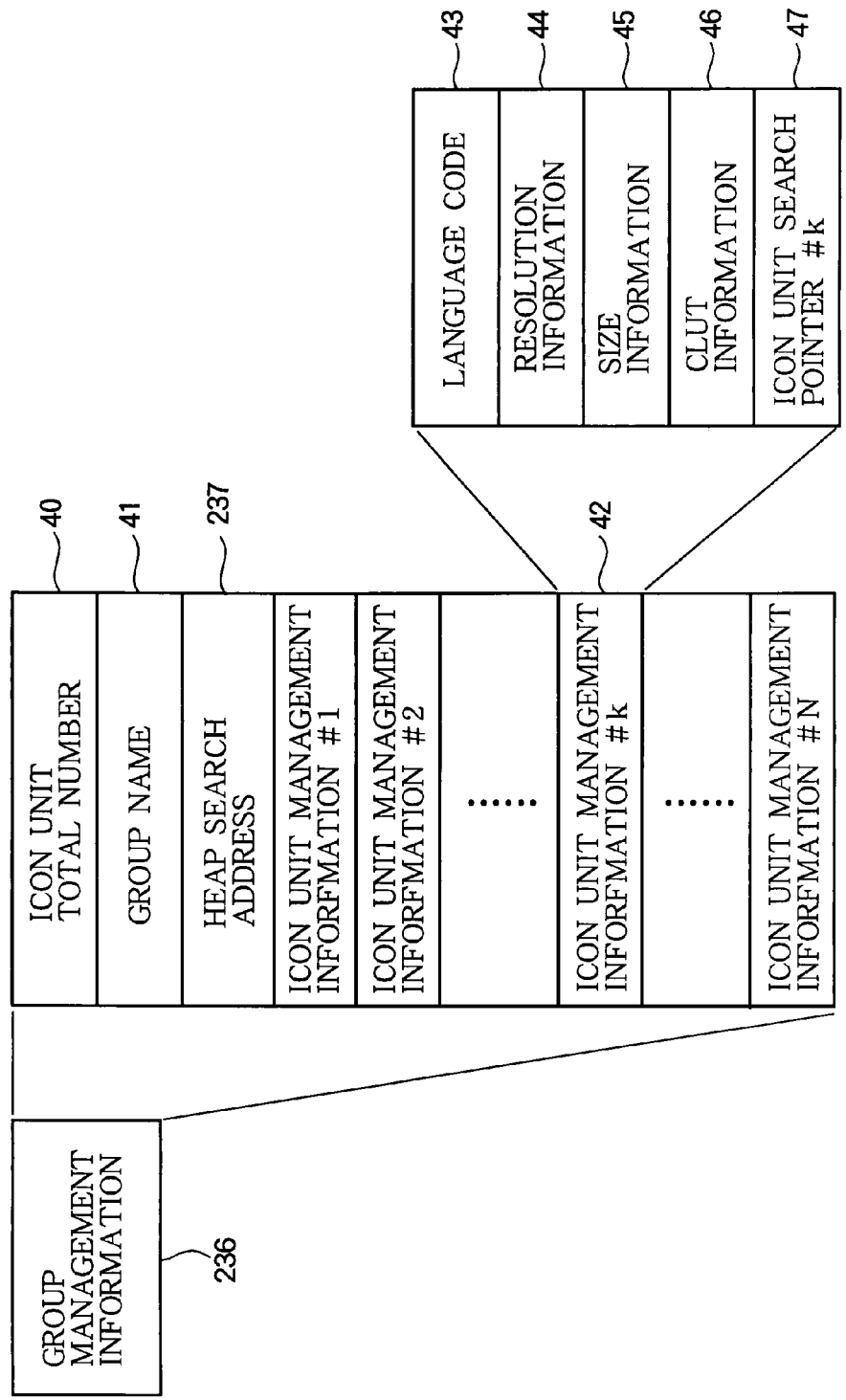
FIG. 20 is a diagram for explaining details of an internal data structure of the group management information shown in FIG. 19.

FIG. 20 is a diagram for explaining details of an internal data structure of the group management information 236 shown in FIG. 19. The constituent elements in FIG. 20 that are the same as or correspond to those in FIG. 3 are assigned the same reference symbols. As shown in FIG. 20, the group management information 236 includes an icon unit total number 40, a group name 41, a heap search address 237, and one or more pieces of icon unit management information 42. The heap search address 237 indicates an offset value (by the unit of sector or byte) of the data heap 221 from the leading end address of the icon groups 223. Other data structure of the group management information 236 in the third embodiment is substantially the same as that of the group management information (FIG. 3) in the first embodiment.

Figure 21:
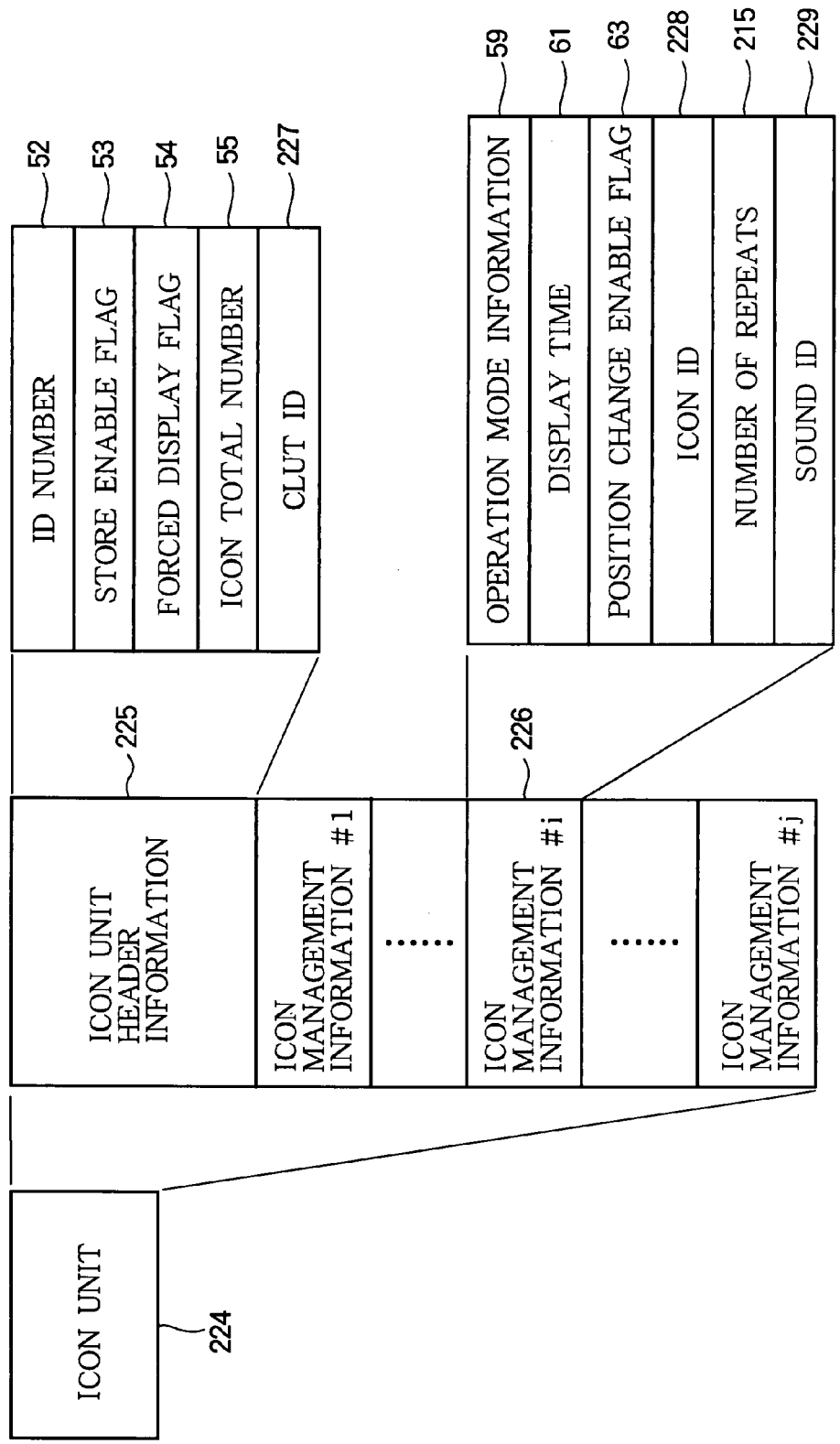
FIG. 21 is a diagram for explaining details of an internal data structure of the icon unit shown in FIG. 19.

FIG. 21 is a diagram for explaining details of an internal data structure of the icon unit 224 shown in FIG. 19. The constituent elements in FIG. 21 that are the same as or correspond to those in FIG. 4 are assigned the same reference symbols. The icon unit 224 includes a single piece of icon unit header information 225 and a plurality of pieces of icon management information 226. The icon unit header information 225 includes an ID number 52, a store enable flag 53, a forced display flag 54, an icon total number 55, and a CLUT ID 227. Although the icon unit header information 50 (FIG. 4) in the first embodiment includes the icon data search pointer field 56 and the CLUT 58, the icon unit header information 225 in the third embodiment includes the CLUT ID 227 in place of the icon data search pointer field 56 and the CLUT 58. An ID number of the CLUT to be used is held in the CLUT ID 227. A code indicative of a pointer number 242 in a CLUT data search pointer field 240 in FIG. 23 to be described later is held in the CLUT ID 227. Except for the above respects, the data structure of the icon unit header information 225 in the third embodiment is substantially the same as the data structure of the icon unit header information 50 (FIG. 4) in the first embodiment.

Meanwhile, the icon management information 226 is integrated information, including identification information, i.e., an icon ID 228 and a sound ID 229, for reading out icon information and sound information by referring to the data heap 221 and control data for output of these IDs, for each operation mode such as "PLAY (reproduce)", "FF (fast forward)" or "PROHIBITED." The icon management information 226 includes operation mode information 59, a display time 61, a position change enable flag 63, the icon ID 228, a number of repeats 215, and the sound ID 229. Except for the number of repeats 215, the icon ID 228, and the sound ID 229, the icon management information 226 in the third embodiment has a structure substantially the same as the icon data 51 (FIG. 4) of the first embodiment. The ID number of the icon to be used is included in the icon ID 228. For example, a code indicative of the pointer information 57 in the icon data search pointer field 56 shown in FIG. 24 to be described later is included in the icon ID number. The ID number of the sound to be used is included in the sound ID 229. For example, a code indicative of a pointer number 256 in a sound data pointer field 254 shown in FIG. 25 to be described later is included in the sound ID 229.

Figure 22:
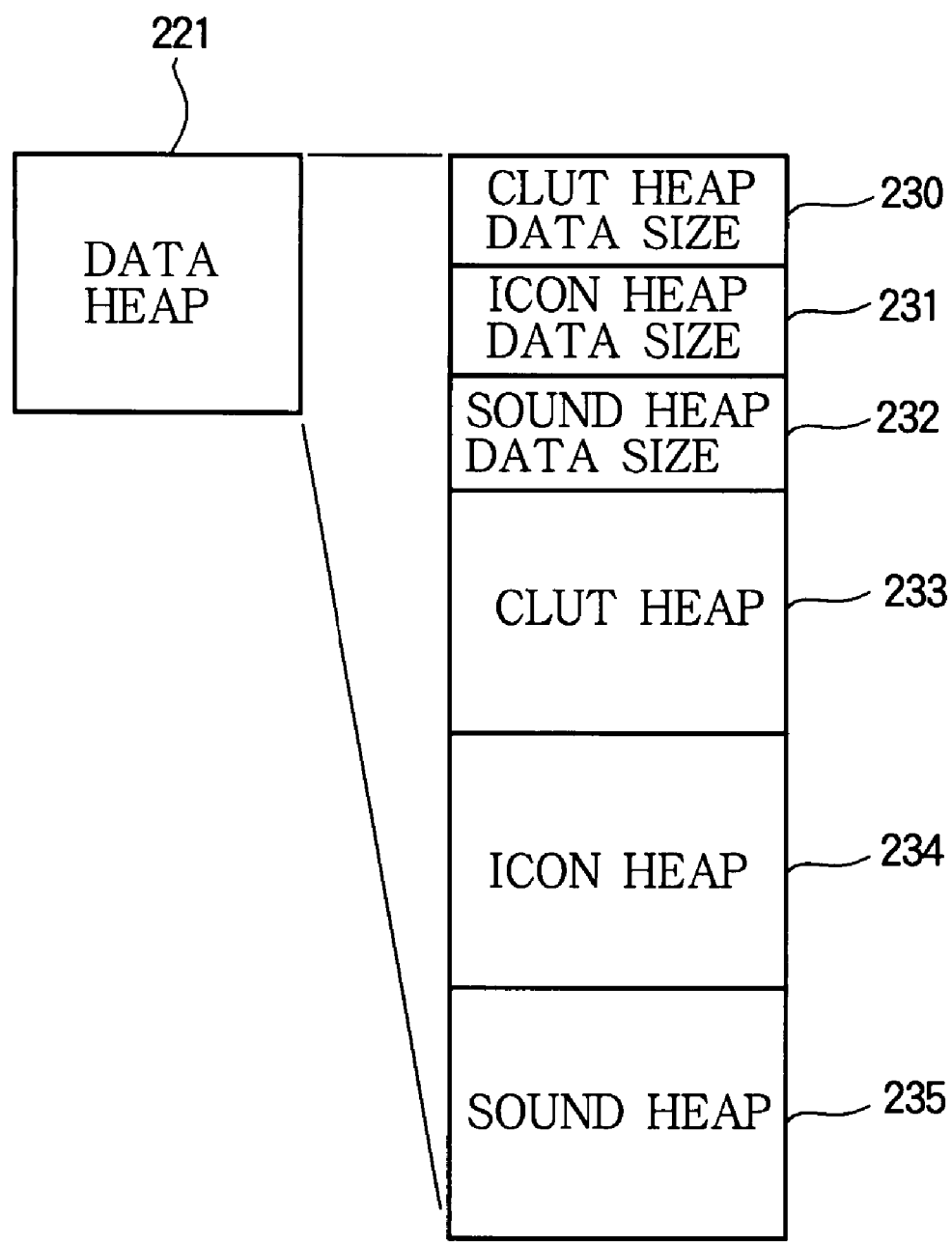
FIG. 22 is a diagram for explaining details of an internal data structure of the data heap shown in FIG. 19.

FIG. 22 is a diagram for explaining details of an internal data structure of the data heap 221 shown in FIG. 19. As shown in FIG. 22, the data heap 221 includes a CLUT heap data size 230, an icon heap data size 231, a sound heap data size 232, a CLUT heap 233, an icon heap 234, and a sound heap 235. The CLUT data, the icon information, and the sound information are located in the data heap 221 in a combined form, aside from the icon information area 222. The CLUT heap data size 230 indicates the size information about the CLUT heap 233 in the area of the data heap 221. The icon heap data size 231 indicates the size information about the icon heap 234 in the area of the data heap 221. The sound heap data size 232 indicates the size information about the sound heap 235 in the area of the data heap 221. Since the CLUT heap data size 230, the icon heap data size 231, and the sound heap data size 232 have a fixed length, the start address of the CLUT heap 233 is started also from a fixed position. The icon heap 234 is started from a location corresponding to an addition of the start address of the CLUT heap 233 and the size shown in the CLUT heap data size 230. The sound heap 235 is started from a location corresponding to an addition of the start address of the icon heap 234 and the size shown in the sound heap data size 232. Stored in the CLUT heap 233, is CLUT-related information shown in FIG. 23 to be described later. Stored in the icon heap 234 is an icon-related information shown in FIG. 24 to be described later. Stored in the sound heap 235 is sound-related information shown in FIG. 25 to be described later.

Figure 23:
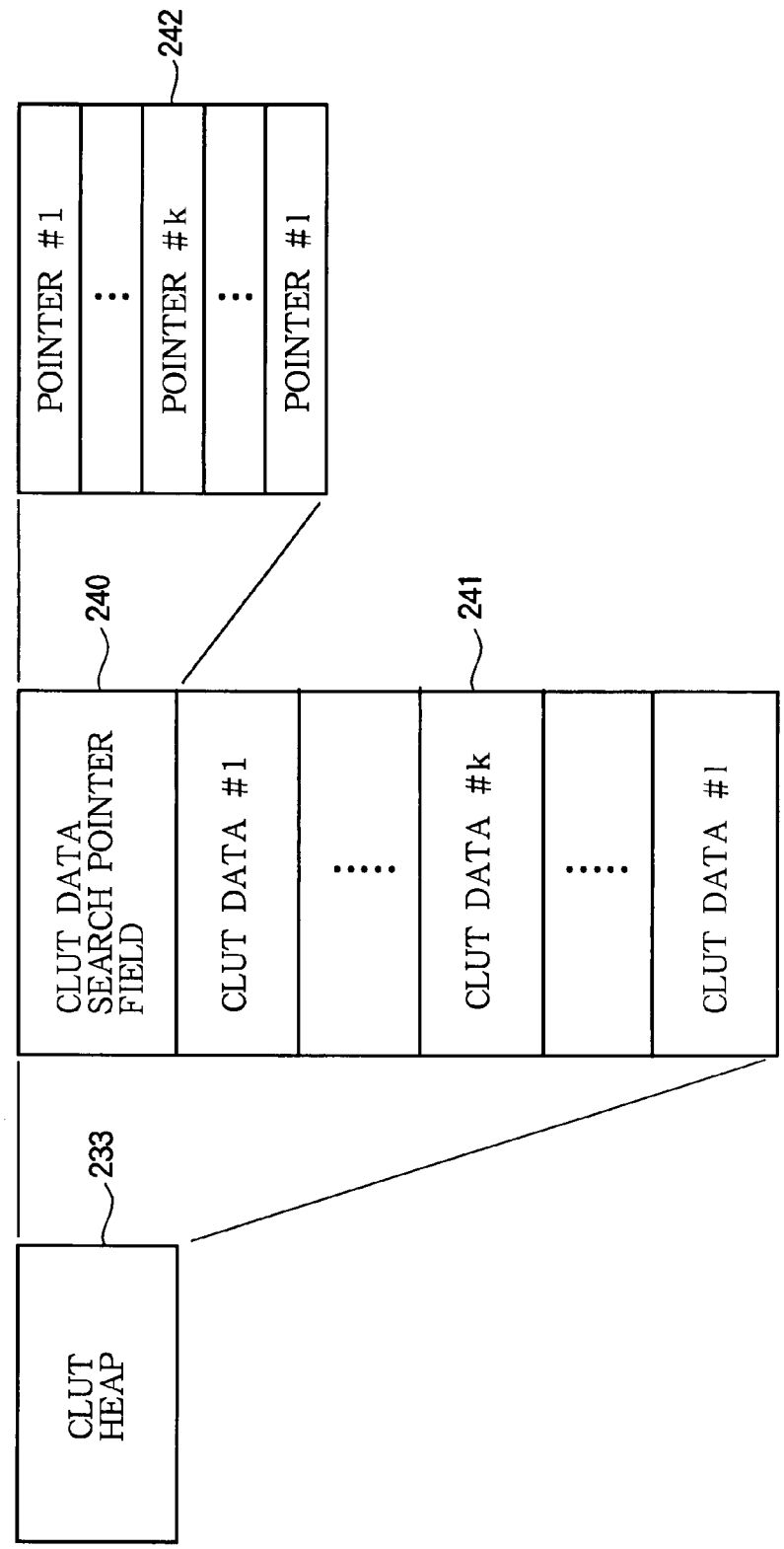
FIG. 23 is a diagram for explaining details of an internal data structure of the CLUT heap shown in FIG. 22.

FIG. 23 is a diagram for explaining details of an internal data structure of the CLUT heap 233 shown in FIG. 22. As shown in FIG. 23, the CLUT heap 233 includes CLUT data search pointer field 240 and one or more pieces of CLUT data 241. The CLUT data search pointer field 240 includes a plurality of pieces of pointer number 242. The number of pieces of the pointer number 242 in the CLUT data search pointer field 240 is the same as a total number of pieces of the CLUT data 241, the pointer number 242 and the CLUT data 241 have a one-to-one correspondence. That is, the pointer #k has an offset value (by the unit of sector or byte) from a leading end position of the CLUT data #k.

Figure 24:
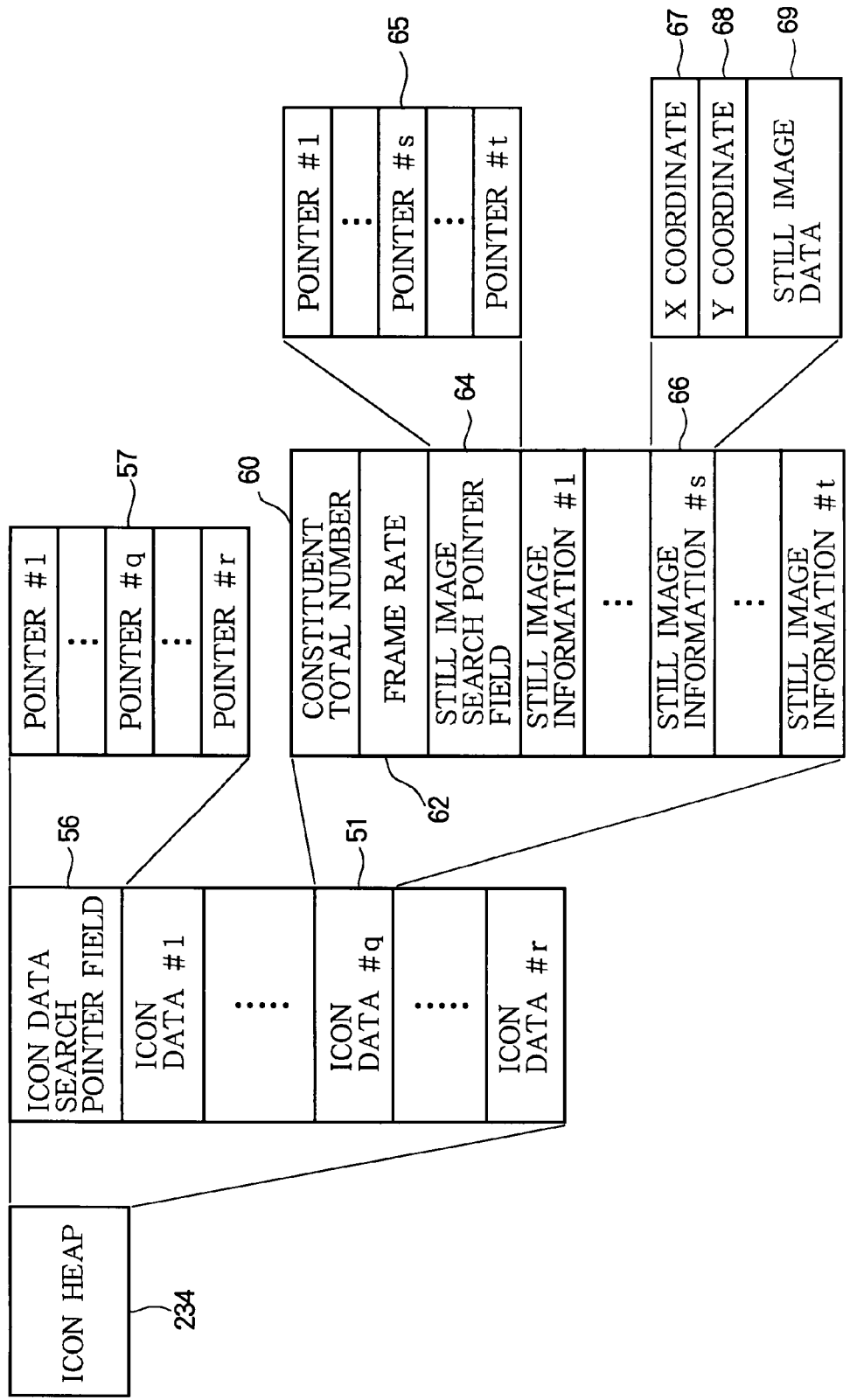
FIG. 24 is a diagram for explaining details of an internal data structure of the icon heap shown in FIG. 22.

FIG. 24 is a diagram for explaining details of an internal data structure of the icon heap 234 shown in FIG. 22. As shown in FIG. 24, the icon heap 234 includes an icon data search pointer field 56 and one or more pieces of icon data 51. The icon data search pointer field 56 includes a plurality of pieces of pointer information 57. The number of the pointers 57 in the icon data search pointer field 56 is the same as a total number of pieces of the icon data 51, and the icon data search pointer field 56 and the icon data 51 have a one-to-one correspondence. That is, a pointer #q has an offset value (by the unit of sector or byte) from a leading end position of the icon data #q. The icon data 51 includes a constituent total number 60, a frame rate 62, a still image search pointer field 64, and still image information 66. Since the constituent elements in FIG. 24 are substantially the same as the constituent elements of the icon data 51 (FIG. 4) in the first embodiment, the same description thereof is omitted.

Figure 25:
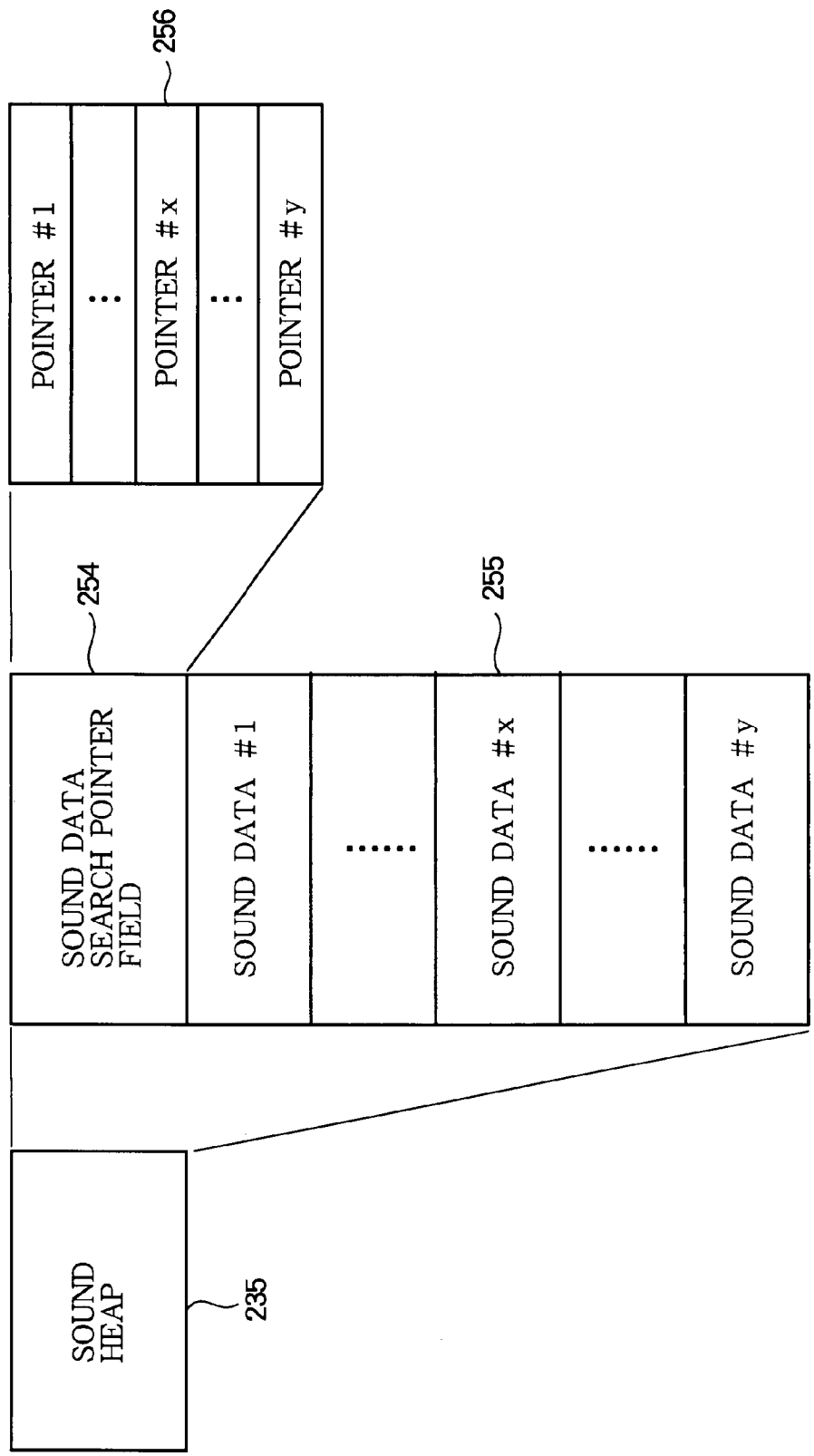
FIG. 25 is a diagram for explaining details of an internal data structure of the sound heap shown in FIG.

FIG. 25 is a diagram for explaining details of an internal data structure of the additional information area 24 shown in FIG. 22. As shown in FIG. 25, the additional information area 24 includes a sound data pointer field 254 and one or more pieces of sound data 255. The sound data pointer field 254 includes a plurality of pieces of pointer information 256. The number of pointers 256 in the sound data pointer field 254 is the same as a total number of pieces of the sound data 255, and the pointers 256 and the sound data 255 have a one-to-one correspondence. That is, the pointer #x have an offset value (by the unit of sector or byte) from a leading end position of the sound data #x.

Since a processing flow from the acquisition of the icon information and sound information from the DVD-ROM disk 220 to the storage thereof in the memory area is the same as that in the first embodiment, the same description thereof is omitted. In this connection, the downloading method has two schemes of "automatic scheme" and "manual scheme" in the same manner as the first embodiment.

Description will be made in detail as to the internal processing data in the DVD-ROM disk 220 after the command data 114 shown in the download command 121 (refer to FIG. 13) is executed and the icon groups 223 specified by the command data 114 is acquired. A schematic flow of the above internal processing data is set in accordance with a routine which follows.

Step ST1: The apparatus executes the download command by clicking the button command.

Step ST2: The apparatus acquires information about the icon groups 223 from the icon information area 222 of the additional information area 24.

Step ST3: The apparatus acquires system setting information of the recording medium reproducing apparatus 1.

Step ST4-2: The apparatus identifies the optimum icon unit 224 from the icon groups 223 on the basis of the system setting information.

Step ST5: The apparatus checks information on the downloading scheme (download destination and icon forced selection).

Step ST6-2: The apparatus stores in the RAM area 15 or in the FLASH area 16 actual data such as the CLUT data, the icon data, and the sound data that are specified by the IDs (the CLUT ID 227, the icon ID 228, and the sound ID 229) by referring to the data heap 221.

Step ST7: The apparatus changes the use icon.

Since the steps ST1 to ST3, ST5, and ST7 are substantially the same as those in the first embodiment, the same description thereof is omitted. Description will now be made as to the steps ST4-2 and ST6-2.

The recording medium reproducing apparatus 1 of the third embodiment shows an example when the language setting is set at "001 (i.e., JAPANESE)", the output resolution is at "01b (i.e., HD)", the number of colors of OSD is at "10b (i.e., 64k)", and the icon size is at "00b (i.e., LARGE)." The recording medium reproducing apparatus 1 first sequentially searches the group management information 236 of the acquired icon group #2 for the optimum icon unit 224 on the basis of the above system setting information. More specifically, the recording medium reproducing apparatus 1 identifies the icon unit 224 having the same information as the code format of the "LANGUAGE SETTING", "OUTPUT RESOLUTION", "SIZE INFORMATION", and "CLUT INFORMATION" in the system setting information from the group management information 236 of the icon group #2.

Next, the recording medium reproducing apparatus 1 acquires actual data such as the CLUT data, the icon data, and the sound data, that are specified by the ID data (the CLUT ID 227, the icon ID 228, and the sound ID 229) in the icon unit 224. All material (the CLUT, the icon, and the sound) information is stored to be integratedly managed in the data heap 221. Thus, when the above CLUT ID 227, the icon ID 228, and the sound ID 229 are used, data can be identified from the data heap 221. The recording medium reproducing apparatus 1 first acquires information about the CLUT ID 227, the icon ID 228, and the sound ID 229 shown in the icon unit 224.

The acquisition of the CLUT data 241 is carried out from the CLUT heap 233 shown in FIG. 23 on the basis of the pointer information 242 corresponding to the number shown in the CLUT ID 227. For example, when the CLUT ID 227 has a value of three, the apparatus refers to the pointer information #3 as the pointer number 242. As a result, the CLUT data #3 specified by the pointer information #3 is used. Similarly, with respect to the icon data 51, the apparatus compares the operation mode information 59 of the icon management information 226 with the operation mode being currently operated, and acquires the icon data from the icon heap 234 shown in FIG. 24 on the basis of the pointer information 57 corresponding to the number shown in the icon ID 228. For example, when the icon ID 228 has a value of two, the apparatus refers to the pointer information #2 as the pointer information 57. As a result, the icon data #2 specified by the pointer information #2 is used. With respect to the sound data 255, the apparatus compares the operation mode information 59 of the icon management information 226 with the operation mode being currently operation, and acquires the sound data from the sound heap 235 shown in FIG. 25 on the basis of the pointer information 256 corresponding to the number shown in the sound ID 229. For example, the apparatus refers to the pointer information #5 as the pointer information 256. As a result, the sound data #5 specified by the pointer information #5 is used.

Since the store enable flag 53 in the icon unit header information 225 of the icon unit 224 is set at "disable", the RAM area 15 is selected as the memory area of the storage destination. The storage in the RAM area 15 is carried out via the data address bus 13. The stored data is actual data such as the CLUT data, the icon data, and the sound data, that are specified by the data heap 221 on the basis of the icon unit 224 specified in the step ST4-2 and the IDs (the CLUT ID 227, the icon ID 228, and the sound ID 229). When completing the storage properly, the apparatus executes the next step ST7.

Description will be made as to a manner in which the icon information and the sound information in the icon unit 224 stored in the memory area are displayed in the third embodiment. Its schematic flow is as follows.

Step ST8: The apparatus sets the route of the data address bus 13 between a memory area, such as the RAM area 15 and the FLASH area 16, and the system controller 14 on the basis of system set value (the priority icon 85 and the selected icon 86 in FIG. 8) information.

Step ST9-2: The apparatus acquires the corresponding icon unit 224 (an animal icon, an animation icon and so on) from the memory area such as the RAM area 15 and the FLASH area 16.

Step ST10-2: The apparatus acquires the icon data 51, the sound data 255, and the CLUT data 241 of the operation mode (PLAY, STOP and so on) to be currently displayed.

Step ST11: The apparatus acquires display conditions information (the constituent total number 60, the frame rate 62 and so on in FIG. 4).

Step ST12-2: The apparatus displays the icon picture (based on the color conversion by the CLUT data 241 and on the switching at the frame rate 62). Also the apparatus outputs the sound data 255.

Since the above steps are substantially the same as those in the first or second embodiment, the same description thereof is omitted.

The third embodiment is different from the first and second embodiments in the respect that the CLUT ID 227, the icon ID 228, and the sound ID 229 are previously stored in the icon unit 224, and main data such as the CLUT data 241, the icon data 51, and the sound data 255 are collectively managed as the other data heap 221. Such a data structure eliminates the need for holding much redundant data. For example, in the first embodiment, when two system configurations are different only in language, such as when one of two system configurations has information about "LANGUAGE: Japanese", "RESOLUTION: HD", "NUMBER OF COLORS: 256", and "SIZE: MEDIUM"; and the other has information about "LANGUAGE: ENGLISH", "RESOLUTION: HD", "NUMBER OF COLORS: 256", and "SIZE: MEDIUM"; the two system configurations have still image information of the same contents. In other words, it is required to have the same data by the same number as the number of languages. Thus, we cannot say that data is effectively used. When the reference destination of the pointer information 57 is set at an icon ID number 288 and the icon heap 234 in FIG. 24 is referred to, data acquisition can be facilitated and the need for having a plurality of pieces of the same data can be eliminated. The same holds true even for the sound data and the CLUT data.

Further, the description has been made in connection with the case where data about the corresponding pointers in the data heap 221 are stored as the CLUT ID 227, the icon ID 228, and the sound ID 229. However, numbers for identifying the CLUT data 241, the icon data 51, and the icon unit header information 225 respectively may be previously allocated, and the numbers may be stored.

Furthermore, although the case where the CLUT ID 227, the icon ID 228, and the sound ID 229 are used has been described in the third embodiment, the effective data storage may be attained by using the ID numbers of any one or two of such IDs and the data heap 221.

What is claimed is:

1. A recording medium reproducing apparatus for reproducing a portable recording medium storing video contents and a plurality of items of icon information, the icon information being information relating to an icon picture associated with the video contents and including information relating to a resolution and number of displayable colors, the icon information corresponding to each operation mode corresponding to user operation of the recording medium reproducing apparatus, the apparatus comprising:
    an image plane which is a frame memory area used for displaying video data of the video contents;
    a storage unit that stores the plurality of items of icon information stored in the portable recording medium;
    an information display plane which is a frame memory area used for displaying the icon picture data on the basis of the icon information stored in the storage unit;
    a selection unit that selects the icon information corresponding to said each operation mode to be held in the information display plane from the plurality of items of icon information stored in the storage unit on the basis of a display capability including the resolution and the number of displayable colors of the information display plane; and
    a synthesizing unit that synthesizes the video data held in the image plane and the icon picture data held in the information display plane, thereby outputting a superimposed video signal.

2. The recording medium reproducing apparatus according to claim 1,
    wherein the portable recording medium further stores an icon data transfer command for transmitting the icon information to the recording medium reproducing apparatus;
    the apparatus further comprising:
    a control unit that acquires the icon data transfer command stored in the portable recording medium and to store the icon information stored in the portable recording medium in the storage unit in accordance with the acquired icon data transfer command.

3. The recording medium reproducing apparatus according to claim 1,
    wherein the portable recording medium further stores sound information relating to a sound indicative of the operation mode corresponding to user operation of the recording medium reproducing apparatus;
    wherein the storage unit stores the sound information together with the icon information;
    the apparatus further comprising an audio output unit that outputs the sound information.

4. A recording medium reproducing apparatus for reproducing a portable recording medium storing video contents and a plurality of items of icon information, the icon information being information relating to an icon picture associated with the video contents and including information relating to a resolution and number of displayable colors, the icon information corresponding to each operation mode corresponding to user operation of the recording medium reproducing apparatus, the apparatus comprising:
    an image plane which is a frame memory area used for displaying video data of the video contents;
    a storage unit that stores the icon information stored in the portable recording medium;
    an information display plane which is a frame memory area used for displaying the icon picture on the basis of the icon information stored in the storage unit;
    a selection unit that selects the icon information corresponding to said each operation mode to be held in the information display plane from the plurality of items of icon information stored in the storage unit on the basis of a display capability including the resolution and the number of displayable colors of an image display apparatus electrically connected to the recording medium reproducing apparatus; and
    a synthesizing unit that synthesizes the video data held in the image plane and the icon picture data held in the information display plane, thereby outputting a superimposed video signal.

5. The recording medium reproducing apparatus according to claim 4,
    wherein the portable recording medium further stores an icon data transfer command for transmitting the icon information to the recording medium reproducing apparatus;
    the apparatus further comprising:
    a control unit configured to acquire the icon data transfer command stored in the portable recording medium and to store the icon information stored in the portable recording medium in the storage unit in accordance with the acquired icon data transfer command.

6. The recording medium reproducing apparatus according to claim 4,
    wherein the portable recording medium further stores sound information relating to a sound indicative of the operation mode corresponding to user operation of the recording medium reproducing apparatus;
    wherein the storage unit stores the sound information together with the icon information;
    the apparatus further comprising an audio output unit that outputs the sound information.

7. A recording medium reproducing method for reproducing a portable recording medium storing video contents and a plurality of items of icon information, the icon information being information relating to an icon picture associated with the video contents and including information relating to a resolution and number of displayable colors, the icon information corresponding to each operation mode corresponding to user operation of a recording medium reproducing apparatus, the method comprising the steps:
  storing the icon information stored in the portable recording medium, in a storage unit;
  selecting the icon information corresponding to said each operation mode to be held in the information display plane from the plurality of items of icon information stored in the storage unit on the basis of a display capability including the resolution and the number of displayable colors of an information display plane, which is a frame memory area used for displaying the icon picture, on the basis of the icon information stored in the storage unit; and
  synthesizing the video data held in an image plane, which is a frame memory area used for displaying video data of the video contents, and the icon picture data held in the information display plane, thereby outputting a superimposed video signal.

8. The recording medium reproducing method according to claim 7,
  wherein the portable recording medium further stores an icon data transfer command for transmitting the icon information to the recording medium reproducing apparatus;
  the method further comprising the steps of:
  acquiring the icon data transfer command stored in the portable recording medium; and
  controlling to store the icon information stored in the portable recording medium, in the storage unit in accordance with the acquired icon data transfer command.

9. The recording medium reproducing method according to claim 7,
  wherein the portable recording medium further stores sound information relating to a sound indicative of the operation mode corresponding to user operation of the recording medium reproducing apparatus;
  wherein the storage unit stores the sound information together with the icon information;
  the method further comprising the step of outputting the sound information.

10. A recording medium reproducing method for reproducing a portable recording medium storing video contents and a plurality of items of icon information, the icon information being information relating to an icon picture associated with the video contents and including information relating to a resolution and number of displayable colors, the icon information corresponding to each operation mode corresponding to user operation of a recording medium reproducing apparatus, the method comprising the steps:
  storing the icon information stored in the portable recording medium, in a storage unit;
  selecting the icon information to be held in an information display plane from the plurality of items of icon information stored in the storage unit on the basis of a display capability including the resolution and the number of displayable colors of an image display apparatus electrically connected to the recording medium reproducing apparatus, the information display plane being a frame memory area used for displaying the icon picture on the basis of the icon information stored in the storage unit; and
  synthesizing the video data held in an image plane, which is a frame memory area used for displaying video data of the video contents, and the icon picture data held in the information display plane, thereby outputting a superimposed video signal.

11. The recording medium reproducing method according to claim 10,
  wherein the portable recording medium further stores an icon data transfer command for transmitting the icon information to the recording medium reproducing apparatus;
  the method further comprising the steps of
  acquiring the icon data transfer command stored in the portable recording medium; and
  controlling to store the icon information stored in the portable recording medium, in the storage unit in accordance with the acquired icon data transfer command.

12. The recording medium reproducing method according to claim 10,
  wherein the portable recording medium further stores sound information relating to a sound indicative of the operation mode corresponding to user operation of the recording medium reproducing apparatus;
  wherein the storage unit stores the sound information together with the icon information;
  the method further comprising the step of outputting the sound information.

13. A portable recording medium for storing information, wherein the information stored in the portable recording medium is reproduced by a recording medium reproducing apparatus, the medium comprising:
  an icon information storage area for storing a plurality of items of icon information relating to an icon picture indicative of an operation mode corresponding to user operation of the recording medium reproducing apparatus and including information relating to a resolution and number of displayable colors; and
  an icon data transfer command storage area for storing a command for use in the recording medium reproducing apparatus in order to transmit the icon information stored in the icon information storage area to the recording medium reproducing apparatus, the command causing the recording medium reproducing apparatus to acquire the icon information stored in the portable recording medium after the recording medium reproducing apparatus has acquired the command.

14. The portable recording medium according to claim 13, further comprising
  a sound information storage area for storing sound information relating to a sound indicative of the operation mode corresponding to user operation of the recording medium reproducing apparatus.

* * * * *